United States Patent
Tanahashi et al.

(10) Patent No.: US 7,041,393 B2
(45) Date of Patent: May 9, 2006

(54) PERPENDICULAR MAGNETIC RECORDING MEDIA, MANUFACTURING PROCESS OF THE SAME, AND MAGNETIC STORAGE APPARATUS USING THE SAME

(75) Inventors: Kiwamu Tanahashi, Kokubunji (JP); Atsushi Kikugawa, Higashimurayama (JP); Yoshio Takahashi, Koganei (JP); Yuzuru Hosoe, Hino (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 10/357,368

(22) Filed: Feb. 4, 2003

(65) Prior Publication Data
US 2004/0009375 A1    Jan. 15, 2004

(30) Foreign Application Priority Data
Jul. 5, 2002 (JP) .............................. 2002-196664

(51) Int. Cl.
*G11B 5/66* (2006.01)
*G11B 5/70* (2006.01)
(52) U.S. Cl. ................................................. 428/831.2
(58) Field of Classification Search .......... 428/694 TS, 428/694 TM, 900, 336, 611, 828, 831.2
See application file for complete search history.

(56) References Cited

U.S. PATENT DOCUMENTS

| 6,686,070 B1* | 2/2004 | Futamoto et al. ...... 428/694 TS |
| 2002/0048693 A1 | 4/2002 | Tanahashi et al. ..... 428/694 TS |
| 2002/0058159 A1 | 5/2002 | Kubota et al. ....... 428/694 TM |

FOREIGN PATENT DOCUMENTS

| JP | 7-129946 | 10/1993 |
| JP | 11-191217 | 12/1997 |
| JP | 2001-155322 | 11/1999 |
| JP | 2002-74648 | 9/2000 |
| JP | 2002-133635 | 10/2000 |

OTHER PUBLICATIONS

European Search Report dated Jun. 4, 2003.

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

A perpendicular recording medium includes a perpendicular recording layer formed over a substrate through a soft magnetic underlayer, the soft magnetic underlayer then being arranged to include a plurality of soft magnetic layers physically separated by a non-magnetic layer, and further, the soft magnetic layers being formed of nanocrystals, with these arrangements, local magnetic loops are formed between the soft magnetic layers that are adjacent to each other through the non-magnetic layer, thereby suppressing spike noise and modulation that arises from the soft magnetic underlayer.

39 Claims, 26 Drawing Sheets

(a)

EASY AXIS OF MAGNETIZATION (b)

(a)

(a)'

(b)

(b)'

(a) COMPARISON 2-M
300 nm (b) COMPARISON 2-L
150 nm x 2

(c) COMPARISON 2-O
100 nm x 3

(d) COMPARISON 2-P
75 nm x 4

(a) COMPARISON 3−A (400 nm)

(b) EMBODIMENT 3−B (133 nm x 3)

(c) EMBODIMENT 3−C (100 nm x 4)

(a) COMPARISON 4 (500 nm)

(b) EMBODIMENT 4 (125 nm x 4)

(a)

(b)

PERPENDICULAR MAGNETIC RECORDING MEDIA, MANUFACTURING PROCESS OF THE SAME, AND MAGNETIC STORAGE APPARATUS USING THE SAME

BACKGROUND OF THE INVENTION

The present invention relates to a perpendicular magnetic recording medium, a method of manufacturing the same, and a magnetic storage apparatus. More specifically, the invention relates to a magnetic recording medium having an areal recording density of 50 gigabits or more per square inch, the method of manufacturing the magnetic recording medium, and a magnetic storage apparatus that incorporates the magnetic recording medium thereinto.

Since 1998, the areal recording density of magnetic hard disk drives has been expanding at an annual increase rate of 100%. However, as the areal recording density is increased, a so-called thermal decay begins to be manifest. The thermal decay is a phenomenon where magnetically recorded data disappears due to the influence of ambient heat. Thus, the conventional longitudinal recording method is considered to be difficult to achieve the areal recording density exceeding 50 gigabits per square inch.

A perpendicular recording method, on the other hand, is different from the longitudinal recording method: this method possesses a feature where as a linear recording density is increased, a demagnetizing field between adjacent bits weakens, thereby maintaining recorded magnetization with stability. Further, by providing a soft magnetic underlayer with a high permeability under a perpendicular recording layer, a stronger head magnetic field is obtained. For this reason the coercivity of the perpendicular recording layer can be increased. For the above-mentioned reasons, the perpendicular recording method is considered to be one of promising means that can surmount the thermal fluctuation limit of the longitudinal recording method.

In the perpendicular recording method, a combination of a double-layer perpendicular recording medium constituted by the soft magnetic underlayer and the perpendicular recording layer with a single-pole-type head is effective in realizing high-density recording. However, since the double-layer perpendicular recording medium includes the soft magnetic underlayer with a high saturation magnetic flux density (Bs), a stray field generated from the domain wall of the soft magnetic underlayer is observed as spike noise. Further, a problem has been pointed out that recorded magnetization disappears due to movement of the domain wall of the soft magnetic underlayer. In order to solve the problems described above, there is proposed a method of providing a hard magnetic pinning layer between the soft magnetic layer and a substrate, thereby aligning magnetization of the soft magnetic underlayer in one direction, as disclosed in JP-A-7-129946 and JP-A-11-191217. There is also proposed a method of constituting the soft magnetic underlayer by a plurality of soft magnetic layers mutually separated by non-magnetic layers, thereby performing magnetization reversal between adjacent soft magnetic layers, as disclosed in JP-A-2001-155322.

In the method of providing the hard magnetic pinning layer, however, magnetic domains tend to be formed at the inner and outer edges of a disk, so that the spike noise might be observed from the magnetic domains. In addition, the process of magnetizing the hard magnetic pinning layer is required, which would raise manufacturing costs. In the method of performing magnetization reversal between adjacent soft magnetic layers, on the other hand, each layer tends to assume a multi-domain structure when the substrate is in the shape of a disk. Thus, it cannot be recognized to be effective in solving the problem of disappearance of recorded magnetization resulting from the domain wall motion.

JP-A-2002-074648 also discloses a method of employing ferromagnetic nanocrystals precipitated by annealing as a material for forming the soft magnetic underlayer. With this method, a clear domain wall is hard to be formed, so that this method is effective in reducing the spike noise and solving the problem of disappearance of recorded magnetization. However, depending on the process of forming a medium, weak spike noise or modulation of an output signal is sometimes observed. Such a reduction in the quality of the output signal becomes a problem when the magnetic hard disk drive is constructed.

SUMMARY OF THE INVENTION

It is therefore an object of the present invention to provide a perpendicular magnetic recording medium with a high recording density of 50 gigabits or more per square inch and a high medium S/N ratio by suppressing spike noise and modulation that will arise from a soft magnetic underlayer. It is a further object of the present invention to realize a high-density magnetic storage apparatus by using the high-density recording medium described above.

In order to achieve the objects described above, in a perpendicular magnetic recording medium according to the present invention, a plurality of soft magnetic layers constituted by nanocrystals and non-magnetic layers for physically separating the soft magnetic layers are seen on a transmission electron microscopy image observed by irradiating the section of the perpendicular magnetic recording medium with an electron beam in the direction of the normal to the section, and 110, 200, and 211 diffraction rings of a body-centered cubic (bcc) structure are seen on an electron diffraction pattern in the same view as for the transmission electron microscopy image.

In the perpendicular magnetic recording medium, local magnetic loops are formed between the soft magnetic layers that are adjacent to each other through the non-magnetic layers. Both of spike noise and modulation of an output signal are thereby suppressed.

On the other hand, in a method of manufacturing a perpendicular magnetic recording medium according to the present invention, for forming a soft magnetic underlayer, alternate lamination of non-magnetic layers and amorphous alloy layers which are mainly constituted by Fe is performed, and annealing for causing α-Fe nanocrystals to be formed from the amorphous alloy layers is performed.

Still further, a magnetic recording apparatus according to the present invention includes the perpendicular magnetic recording medium of which the soft magnetic underlayer includes a plurality of the soft magnetic layers physically separated by the non-magnetic layers, and the soft magnetic layers are constituted by the nanocrystals with a generally random crystallographic orientation.

BRIEF DESCRIPTION OF THE DRAWINGS

FIG. 14(a)' is a schematic diagram of the bright-field image of the medium section observed by the TEM;

FIG. 14(b)' is a schematic diagram showing the electron diffraction pattern;

Figure 1:
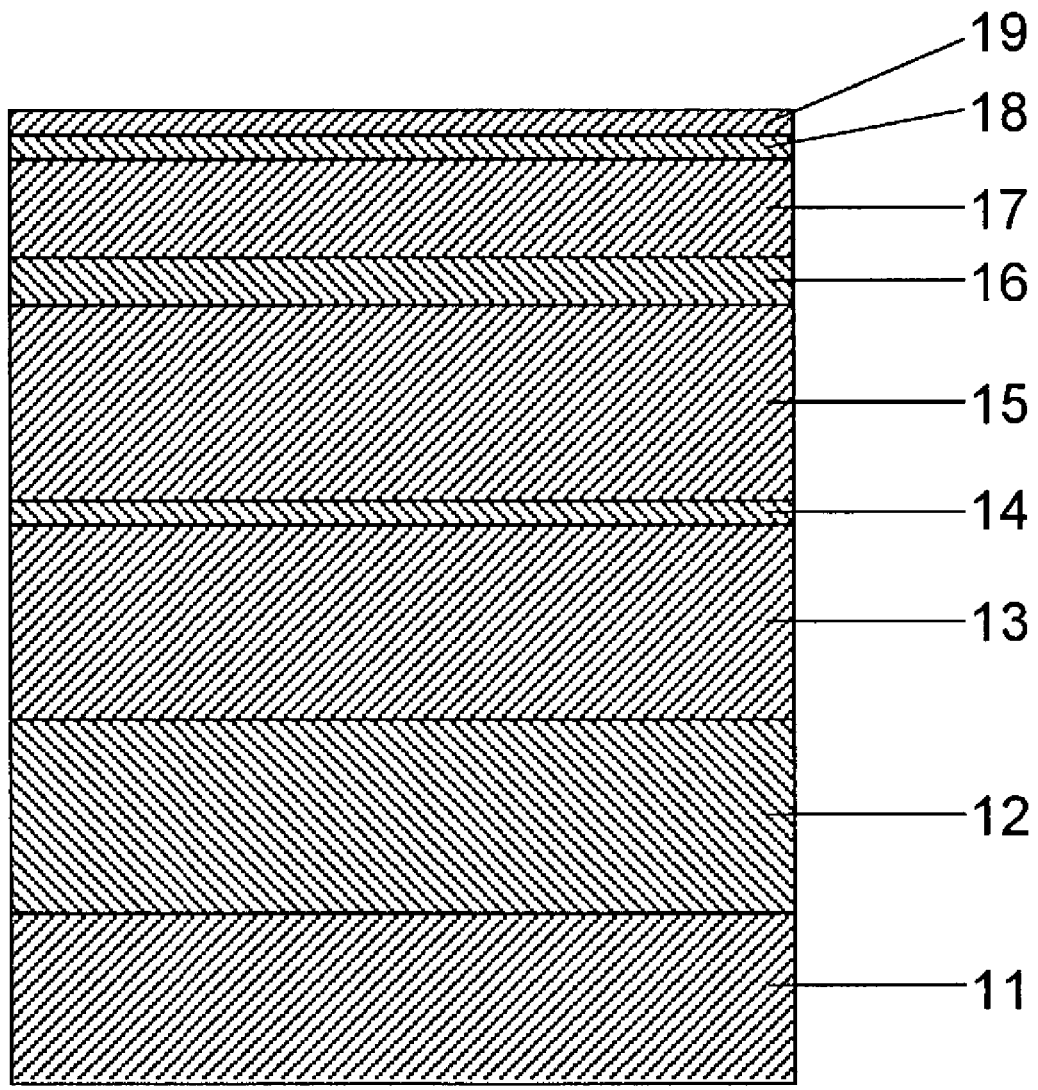
FIG. 1 is a sectional view of a perpendicular recording medium according to a first embodiment of the present invention.

Other objects, features and advantages of the invention will become apparent from the following description of the embodiments of the invention taken in conjunction with the accompanying drawings.

DETAILED DESCRIPTION OF THE EMBODIMENTS

A perpendicular magnetic recording medium and a magnetic storage apparatus according to the present invention will be described in detail with reference to the accompanying drawings.

In the perpendicular magnetic recording medium according to the present invention, a perpendicular recording layer is formed over a substrate through a soft magnetic underlayer. The soft magnetic underlayer is arranged to be a multilayer film constituted by a plurality of soft magnetic layers mutually and physically separated by non-magnetic layers. These soft magnetic layers are formed of nanocrystals of which crystallographic orientation is generally random.

The nanocrystals herein refer to granular crystals with a size of approximately 5 to 15 nm. The nanocrystals are different from columnar crystals which are often seen in a thin film formed by a sputtering method in their geometries. "Mutual separation" refers to physical isolation. The non-magnetic layers for isolating the soft magnetic layers are characterized by having a thickness to the extent to which local magnetic loops are formed between adjacent soft magnetic layers. Accordingly, the non-magnetic layers need to be non-magnetic films that are so extremely thin that can be magnetostatically coupled to the adjacent soft magnetic layers.

A material which is substantially amorphous during film formation and from which ferromagnetic nanocrystals are formed by annealing is employed for the soft magnetic layers. Specifically, an FeTaC alloy, an FeNbC alloy, or an FeTiC alloy can be employed. Further, a small amount (0.5–1.5 at %) of Cu may be added to these alloys so as to reduce the size of α-Fe nanocrystals formed after annealing. On the other hand, by adding Co to these alloys and thereby causing α-FeCo nanocrystals having a Co concentration of 20–40 at %) to be formed, the Bs of the soft magnetic layers can be enhanced.

The resulting α-Fe nanocrystals formed from the layer of the amorphous alloy by this annealing becomes random or disoriented three-dimensionally.

In the perpendicular magnetic recording medium having the configuration described above, through a magnetostatic interaction that works between the soft magnetic layers formed to be adjacent to one another through the nonmagnetic layer, local magnetic loops are formed. Accordingly, it is considered that a leakage flux is thereby restrained, so that spike noise is suppressed.

When the film thickness of each of the soft magnetic layers is set to be a range from 50 to 150 nm, the interlayer magnetostatic interaction can be efficiently worked. If the film thickness of each of the soft magnetic layers is set to be thinner than 50 nm, the coercivity of each of the soft magnetic layers increases. As a result, the magnetostatic interaction will not efficiently work. On the contrary, if the film thickness of each of the soft magnetic layers is set to be thicker than 150 nm, the effect of the magnetostatic interaction relatively decreases, so that the film thickness thicker than 150 nm is not desirable.

For the non-magnetic layer formed between the soft magnetic layers, a material is employed which reacts as little as possible during annealing of the soft magnetic layers and becomes continuous when formed as a thin film. Specifically, it is preferable that an amorphous metal which has a high melting point and of which the film flatness is high, such as Ta, a NiTa alloy, a NiNb alloy, NiTaZr alloy, or a NiNbZr alloy is employed. Amorphous materials such as B, C, Si, and Ge react with the soft magnetic layers during annealing described above. Then, as a result, they magnetically become continuous, so that they do not act as the non-magnetic layers. Thus, these materials are not desirable for this application. "Amorphous" crystals herein has an irregular atomic arrangement that does not have long-range ordering but has short-range ordering, and also refer to extremely fine crystals with their grain size of approximately 2–3 nm, which do not exhibit a clear diffraction peak when subjected to an X-ray diffraction analysis.

Preferably, the film thickness of the respective non-magnetic layers is reduced as much as possible, in order to cause the interlayer magnetostatic interaction between adjacent soft magnetic layers to work strongly. By employing an amorphous metal such as Ta, the NiTa alloy, the NiNb alloy, the NiTaZr alloy, or the NiNbZr alloy, which has a high melting point and exhibits a high film flatness, the film thickness of the non-magnetic layer can be reduced to approximately 1 nm.

The film thickness and the number of layers for the soft magnetic layers constituting the soft magnetic underlayer can be selected according to the coercivity of the perpendicular recording layer and the size of a magnetic head. When the soft magnetic underlayer of which the film thickness is 300 nm is required, various combinations of layers can be selected as the multilayer film: a bi-layer film with their respective film thickness of 150 nm, a tri-layer film with their respective film thickness of 100 nm, or a quad-layer film with their respective film thickness of 75 nm can be selected.

The soft magnetic underlayer may be directly formed on the substrate. However, by forming the soft magnetic underlayer through a nonmagnetic pre-coat layer formed on the substrate, non-uniformity in soft magnetic characteristics attributed to the material of the substrate and a temperature distribution during annealing can be suppressed. A material that has good adhesion to the substrate and a flat surface, and exhibits low reactivity with the soft magnetic underlayer during annealing described above is desirable for forming the pre-coat layer.

When the perpendicular recording layer is formed over the soft magnetic underlayer through a nonmagnetic intermediate layer, medium noise is suppressed. Thus, formation of the nonmagnetic intermediate layer is more desirable for formation of the perpendicular magnetic recording medium. An amorphous alloy, an alloy of a hexagonal closed packed (hcp) structure, or an alloy of a face centered cubic (fcc) structure can be employed as a material for the intermediate layer. The intermediate layer may be a single-layer film. Alternatively, a bi-layer film constituted by the amorphous alloy and the alloy of the hcp structure can also be employed. A hcp-Co alloy such as a CoCrPt alloy or a CoCrPtB alloy, a Co/Pd multilayer film, a CoB/Pd multilayer film, a CoSi/Pd multilayer film, Co/Pt multilayer film, a CoB/Pt, or a CoSi/Pt multilayer film can be employed for the perpendicular recording layer.

Next, a magnetic storage apparatus that includes the perpendicular recording medium having the above-mentioned configuration will be described. This magnetic storage apparatus includes the perpendicular recording medium described above, a driving section for driving this medium in a recording direction, a magnetic head constituted by a recording section and a reproducing section, a unit for causing the magnetic head to move relative to the perpendicular recording medium, and a recording/reproduction processing unit for receiving a signal from the magnetic head and reproducing an output signal from the magnetic head. The magnetic storage apparatus is characterized in that the recording section of the magnetic head is constituted by a single-pole-type head, and the reproducing section of the magnetic head is constituted by a highly sensitive element that utilizes a magnetoresistive effect or a tunneling magnetoresistive effect.

The magnetic storage apparatus configured as described above includes a magnetic recording medium where spike noise and modulation are sufficiently reduced. Thus, the magnetic storage apparatus having an areal recording density of 50 gigabits or more per square inch and a high reliability can be implemented.

First Embodiment

FIG. 1 shows a layer configuration of a magnetic recording medium according to a first embodiment. An alkali-cleaned, 2.5-inch type glass disk is employed for a substrate 11. A pre-coat layer 12, a soft magnetic layer 13, a non-magnetic layer 14, a soft magnetic layer 15, an intermediate layer 16, a perpendicular recording layer 17, and a protective layer 18 were laminated one upon another in this stated order using DC magnetron sputtering. Table 1 shows target compositions employed for formation of the respective layers. A layer structure constituted by the soft magnetic layer 13, the non-magnetic layer 14, and the soft magnetic layer 15 corresponds to the soft magnetic underlayer of a double-layer perpendicular recording medium. The number of the soft magnetic layers constituting the soft magnetic underlayer is employed herein for convenience; this underlayer is written as the bi-layer film soft magnetic underlayer.

TABLE 1

| | Target composition |
|---|---|
| Pre-coat layer | Ni-37.5 at % Ta-10 at % Zr |
| Soft magnetic layer | Fe-8 at % Ta-12 at % C |
| | Fe-10 at % Ta-16 at % C-1 at % Cu |
| Non-magnetic | Ta |

TABLE 1-continued

| | Target composition |
|---|---|
| layer | Ni-37.5 at % Ta-10 at % Zr |
| Intermediate layer | Ni-37.5 at % Ta-10 at % Zr |
| Perpendicular rec. layer | Co-22 at % Cr-14 at % Pt |
| Protective layer | Carbon |

Figure 2:
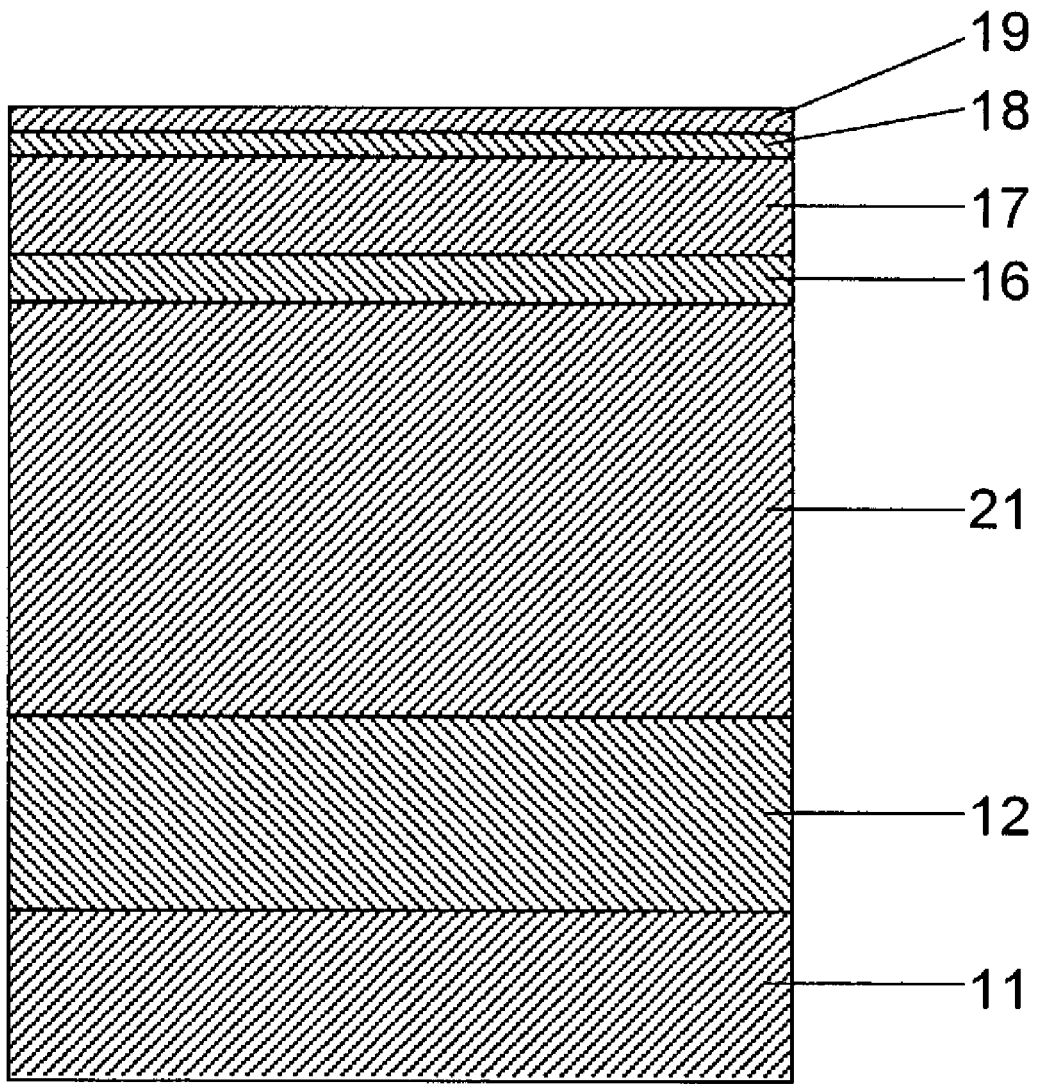
FIG. 2 is a sectional view of a perpendicular recording medium of a comparison example.

Materials employed for the soft magnetic layers 13 and 15 are amorphous during film formation and are slightly magnetized, so that they are not suitable for the magnetic underlayer. Accordingly, after the soft magnetic underlayer has been formed in order to cause α-Fe nanocrystals with a great magnetic moment to be formed, annealing using an infrared lamp heater is performed for 12 seconds at a substrate reaching temperature of approximately 420° C. The Bs of the soft magnetic underlayer after this heat treatment was 1.6 to 1.7T. A perfluoroalkylpolyether material is diluted with a fluorocarbon material for application as a lubricant layer 19. As comparison examples, samples with a single-layer film or a soft magnetic layer 21 employed as the soft magnetic underlayer as shown in FIG. 2 were fabricated under the same film forming conditions. The film thickness of the single-layer soft magnetic film 21 of the comparison examples was set to the bi-layer film thickness, which is the sum of the thickness of the soft magnetic layer 13 and the thickness of the soft magnetic layer 15. Table 2 shows layer configurations and respective layer film thicknesses of media according to this embodiment and the comparison example media.

Figure 3:
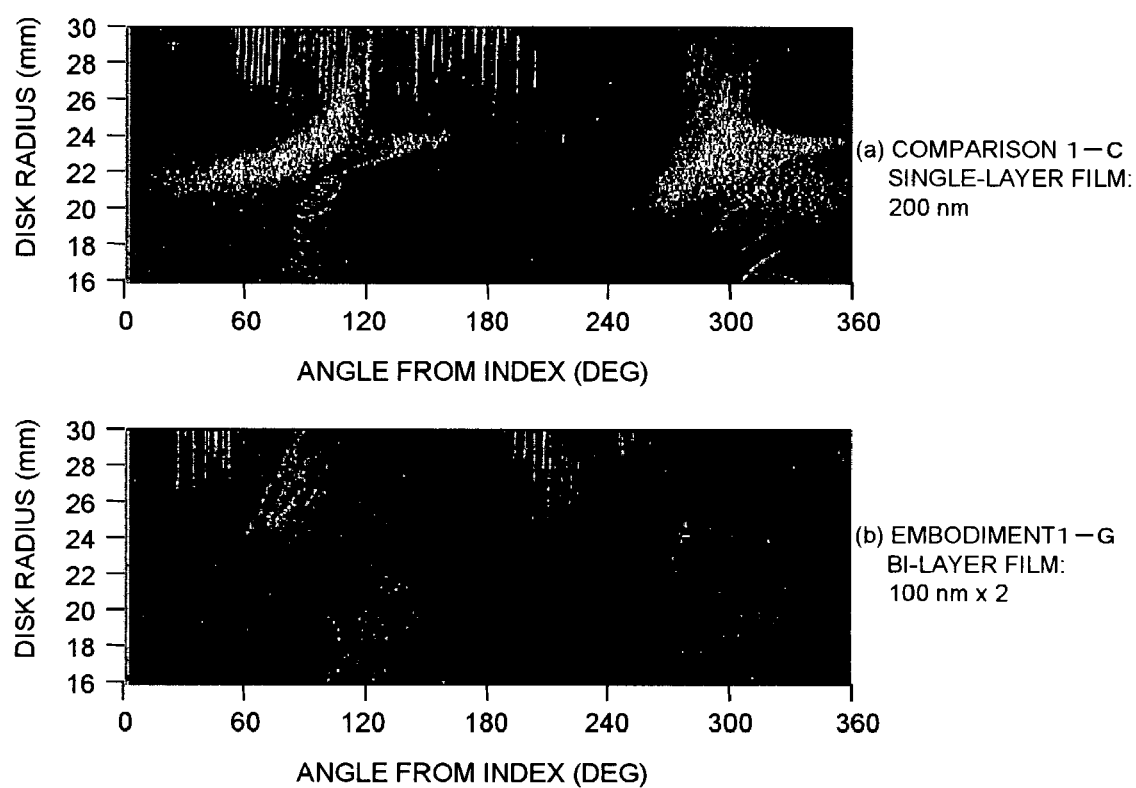
FIGS. 3(a) and 3(b) are characteristic diagrams showing spike noise distributions of a comparison example medium and the medium in the first embodiment, respectively.
Figure 4:
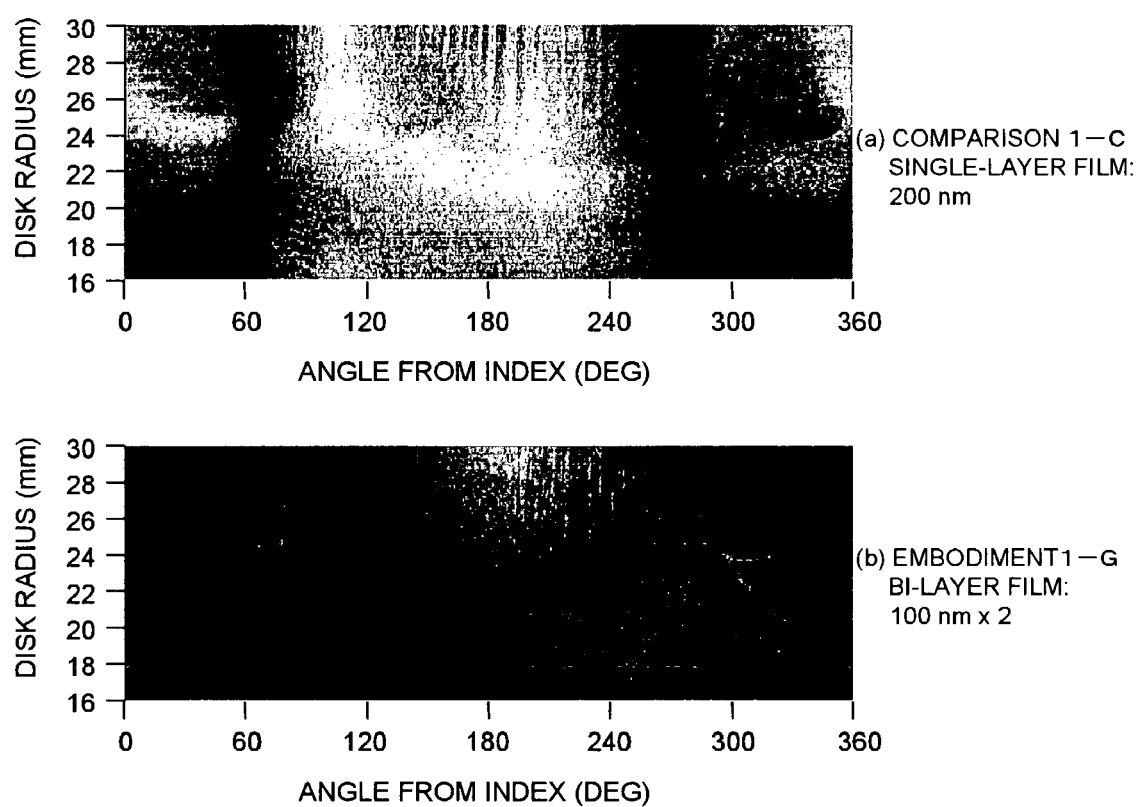
FIGS. 4(a) and 4(b) are characteristic diagrams of modulation of read outputs for the comparison example medium and the medium in the first embodiment, respectively.

FIGS. 3(*a*) and 3(*b*) show the spike noise maps of a comparison example medium and the medium in this embodiment, respectively. FIGS. 4(*a*) and 4(*b*) show modulation images of the comparison example medium and the medium in this embodiment, respectively. For evaluation, a spin stand and a digital oscilloscope are employed, and a disk radius in the range of 16–30 mm was measured at 100 μm pitches. It can be seen that in the medium-in this embodiment, by using the bi-layer film as the soft magnetic underlayer through the non-magnetic layer 14, the spike noise corresponding to white portions in FIG. 3(*a*) has greatly decreased, and modulation of a read output, corresponding to shaded portions in FIG. 3(*b*) has been also suppressed.

Figure 5:
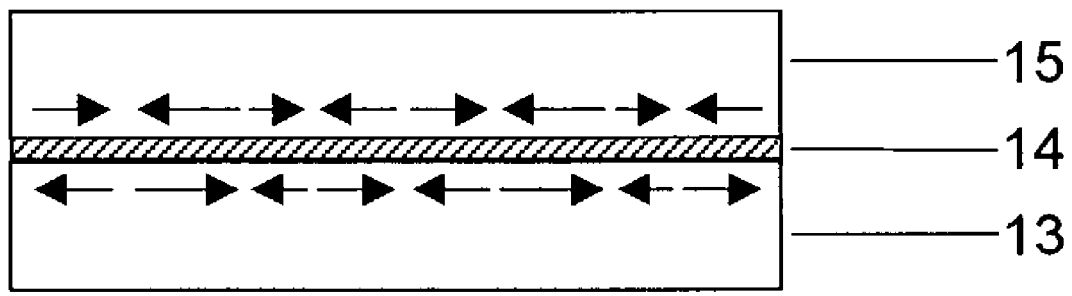
FIG. 5 is a schematic diagram of local magnetic loops formed between soft magnetic layers that are adjacent to each other through a non-magnetic layer.

The reason why the spike noise has been suppressed is considered to be that the interlayer magnetostatic interaction works between the soft magnetic layer 13 and the soft magnetic layer 15 as shown in FIG. 5, so that local magnetic loops are formed, thereby reducing the leakage flux. On the other hand, the reason why modulation is suppressed is considered to be as follows: though strong uniaxial anisotropy as seen in amorphous materials is not induced to the soft magnetic layers in this embodiment and the soft magnetic layers of the comparison example, weak uniaxial anisotropy is sometimes induced during a film formation process.

Figure 6:
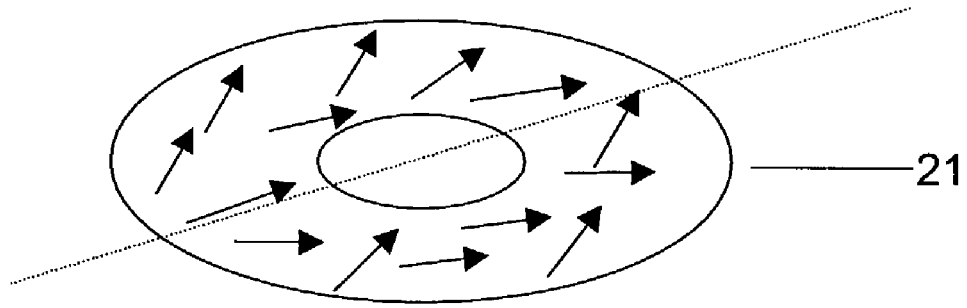
FIGS. 6(a) and 6(b) are schematic diagrams showing magnetization states of the soft magnetic underlayer of the comparison example medium and the soft magnetic underlayer of the medium in the first embodiment, respectively.
Figure 6:
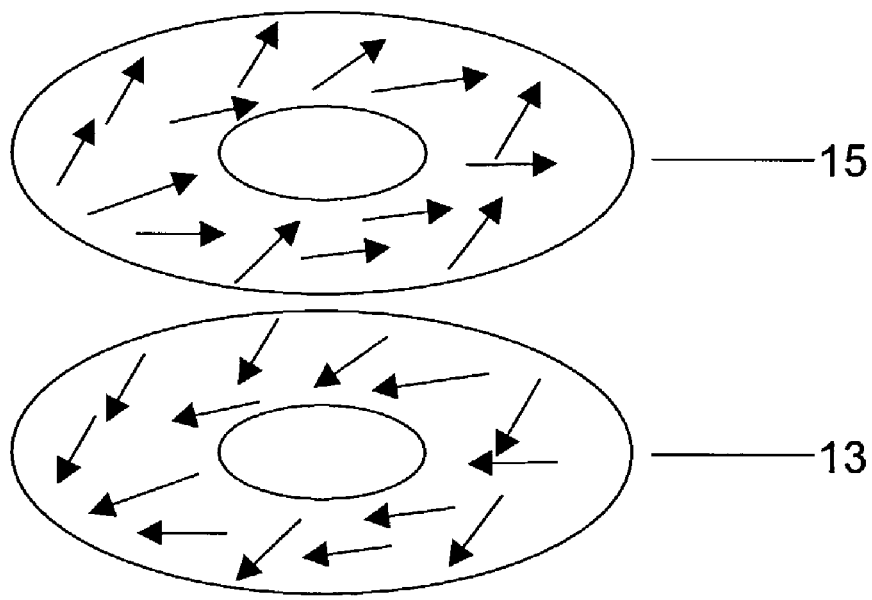

To take an example, in the comparison example medium that has employed the single-film soft magnetic underlayer, a direction indicated by a dotted line in FIG. 6(*a*) becomes an easy axis of magnetization, and magnetization of the soft magnetic underlayer after formation of the medium is considered to be in the state indicated by arrows in FIG. 6(*a*). Since write efficiency and read efficiency are subject to the

TABLE 2

| | Media | Pre-coat layer (nm) | Soft magnetic underlayer (nm) | Intermediate layer (nm) | Perpendicular rec. layer (nm) | Protective layer (nm) |
|---|---|---|---|---|---|---|
| Comparison 1 | A | NiTaZr (100) | FeTaC (400) | NiTaZr (5) | CoCrPt (20) | C (5) |
| | B | NiTaZr (100) | FeTaC (300) | NiTaZr (5) | CoCrPt (20) | C (5) |
| | C | NiTaZr (100) | FeTaC (200) | NiTaZr (5) | CoCrPt (20) | C (5) |
| | D | NiTaZr (100) | FeTaC (100) | NiTaZr (5) | CoCrPt (20) | C (5) |
| Embodiment 1 | E | NiTaZr (100) | FeTaC (200)/Ta (2.5)/FeTaC (200) | NiTaZr (5) | CoCrPt (20) | C (5) |
| | F | NiTaZr (100) | FeTaC (150)/Ta (2.5)/FeTaC (150) | NiTaZr (5) | CoCrPt (20) | C (5) |
| | G | NiTaZr (100) | FeTaC (100)/Ta (2.5)/FeTaC (100) | NiTaZr (5) | CoCrPt (20) | C (5) |
| | H | NiTaZr (100) | FeTaC (50)/Ta (2.5)/FeTaC (50) | NiTaZr (5) | CoCrPt (20) | C (5) |
| | I | NiTaZr (100) | FeTaCCu (150)/NiTaZr (30)/FeTaCCu (150) | NiTaZr (5) | CoCrPt (20) | C (5) |
| | J | NiTaZr (100) | FeTaCCu (150)/NiTaZr (10)/FeTaCCu (150) | NiTaZr (5) | CoCrPt (20) | C (5) |
| | K | NiTaZr (100) | FeTaCCu (150)/NiTaZr (5)/FeTaCCu (150) | NiTaZr (5) | CoCrPt (20) | C (5) |
| | L | NiTaZr (100) | FeTaCCu (150)/NiTaZr (3)/FeTaCCu (150) | NiTaZr (5) | CoCrPt (20) | C (5) |
| | M | NiTaZr (100) | FeTaCCu (150)/NiTaZr (2.5)/FeTaCCu (150) | NiTaZr (5) | CoCrPt (20) | C (5) |
| | N | NiTaZr (100) | FeTaCCu (150)/NiTaZr (1)/FeTaCCu (150) | NiTaZr (5) | CoCrPt (20) | C (5) |

Numbers in parentheses indicate the thickness of each layer.

influence of the magnetization state of the soft magnetic underlayer, modulation occurs in the read output as a result. On the other hand, in the medium using the bi-layer soft magnetic underlayer, according to the present invention, the interlayer magnetostatic interaction described above works. Thus, magnetization of the soft magnetic underlayer after formation of the medium is considered to be in the state indicated by arrows in FIG. 6(b). It is considered that local reversal of magnetization in this manner reduces variations in the write efficiency and the read efficiency, so that modulation of the read output has been reduced.

Figure 7:
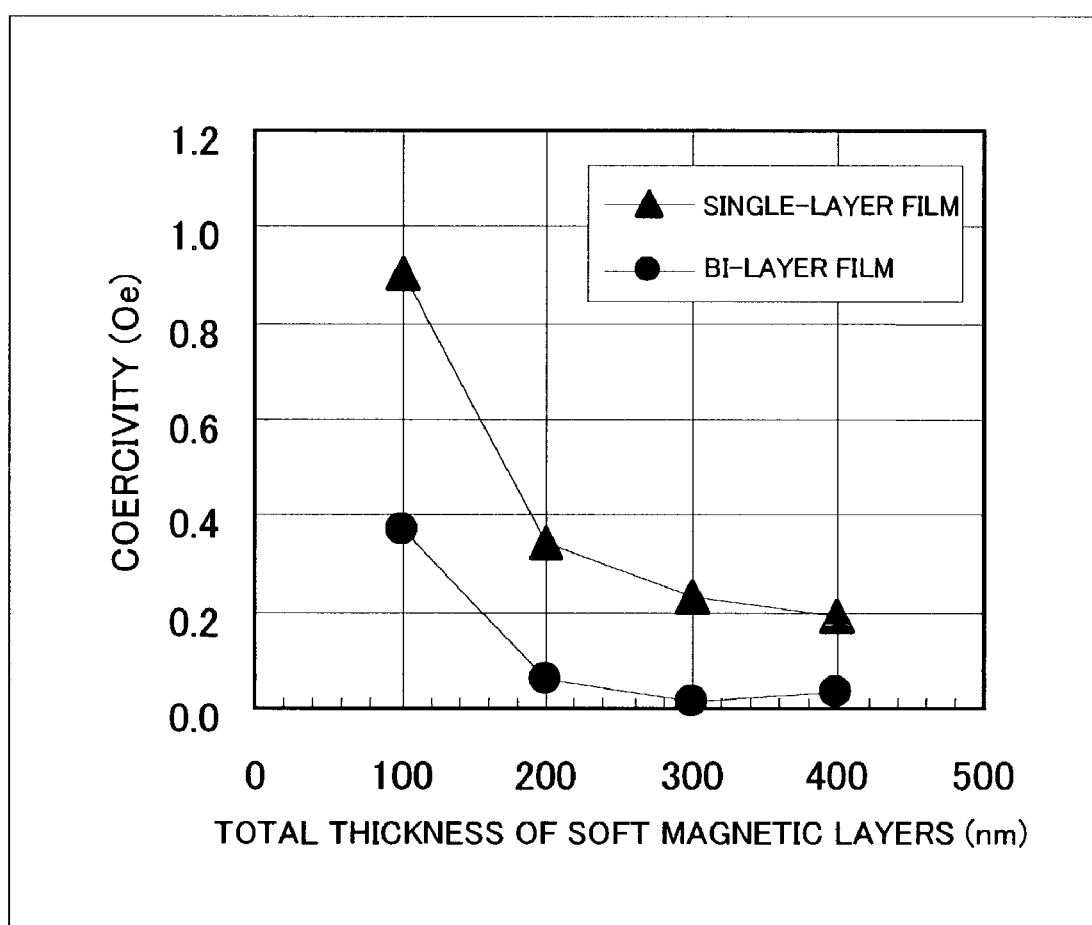
FIG. 7 shows characteristic graphs indicating relationships between the coercivity of the soft magnetic underlayer and the total film thickness of the soft magnetic layers.

FIG. 7 shows relationships between the coercivity of the soft magnetic underlayer and the total film thicknesses of the soft magnetic layers. The coercivity values were measured along the easy axis of magnetization. By employing the bi-layer film as the soft magnetic underlayer regardless of the film thickness, a low coercivity can be obtained. This result implies that the interlayer magnetostatic interaction works between the soft magnetic layer 13 and the soft magnetic layer 15.

Figure 8:
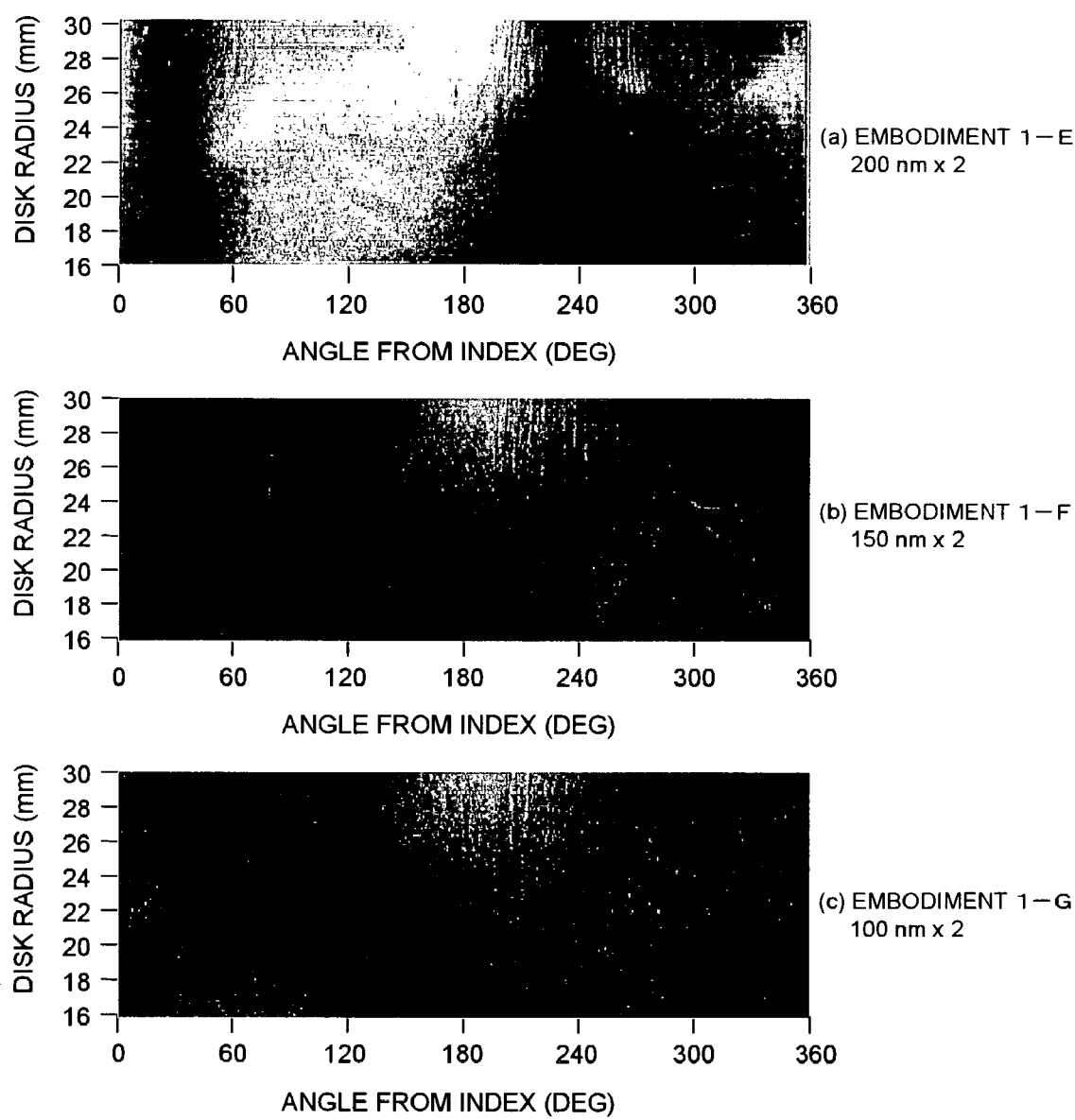
FIGS. 8(a), 8(b), and 8(c) are characteristic diagrams showing modulation of read outputs for media in the first embodiment.
Figure 9:
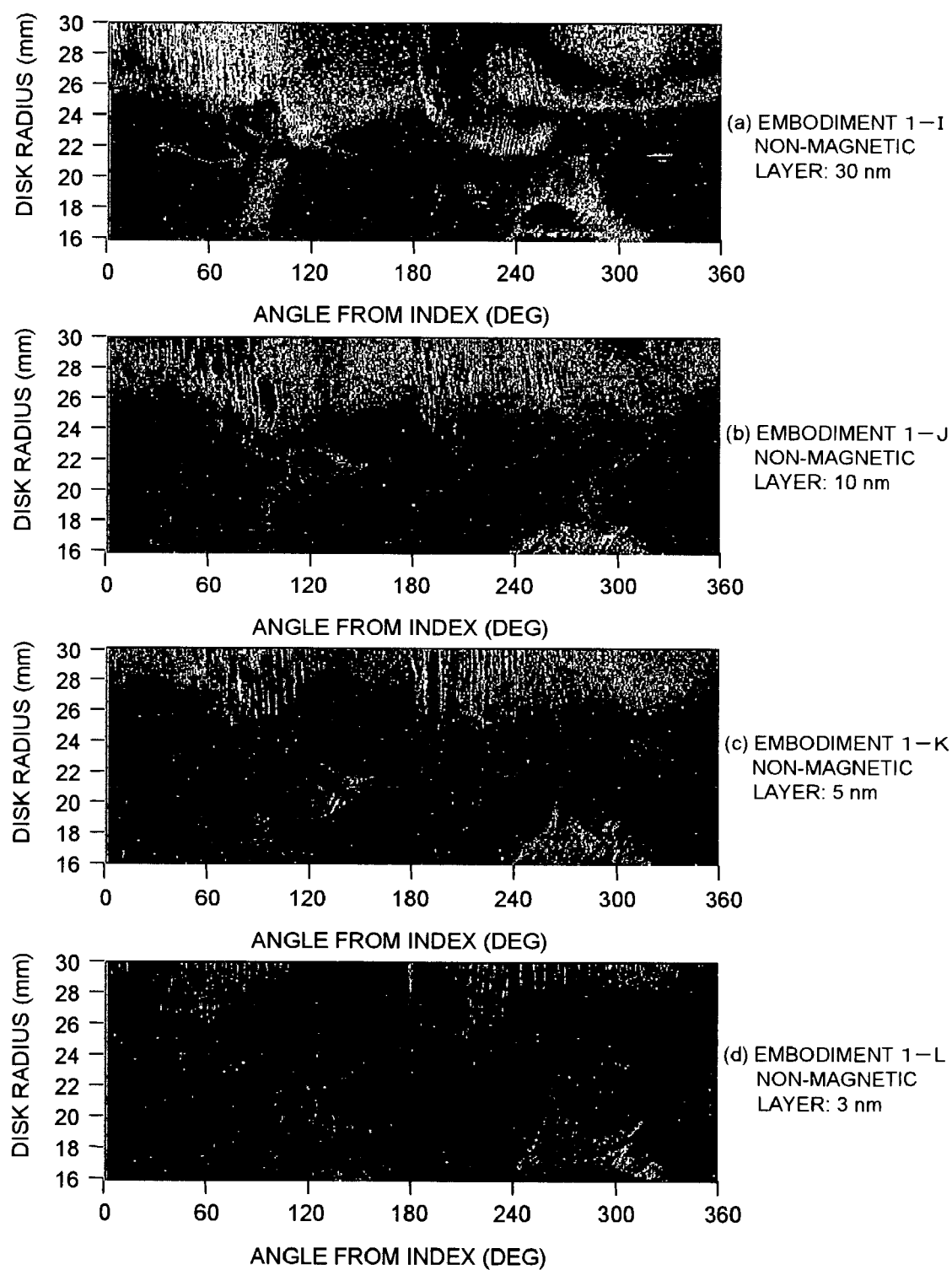
FIGS. 9(a), 9(b), 9(c), and 9(d) are characteristic diagrams showing spike noise distributions of media in the first embodiment.

FIGS. 8(a), 8(b), and 8(c) show modulation images of the read outputs by the media in this embodiment, of which the film thickness of each of the soft magnetic layers 13 and 15 has been changed. When the film thickness of each of the soft magnetic layers is 100 nm or 150 nm, modulation is suppressed. When the film thickness is 200 nm or thicker, a comparatively large modulation is observed. This is because, since a difference between the magnetic head and the soft magnetic layer 13 on the side of the substrate increases, the write efficiency and the read efficiency is greatly influenced by the soft magnetic layer 15 on the side of the perpendicular recording layer. Accordingly, in order to suppress modulation of the read output, it is preferable that the film thickness of each of the soft magnetic layers is not more than 150 nm.

Figure 10:
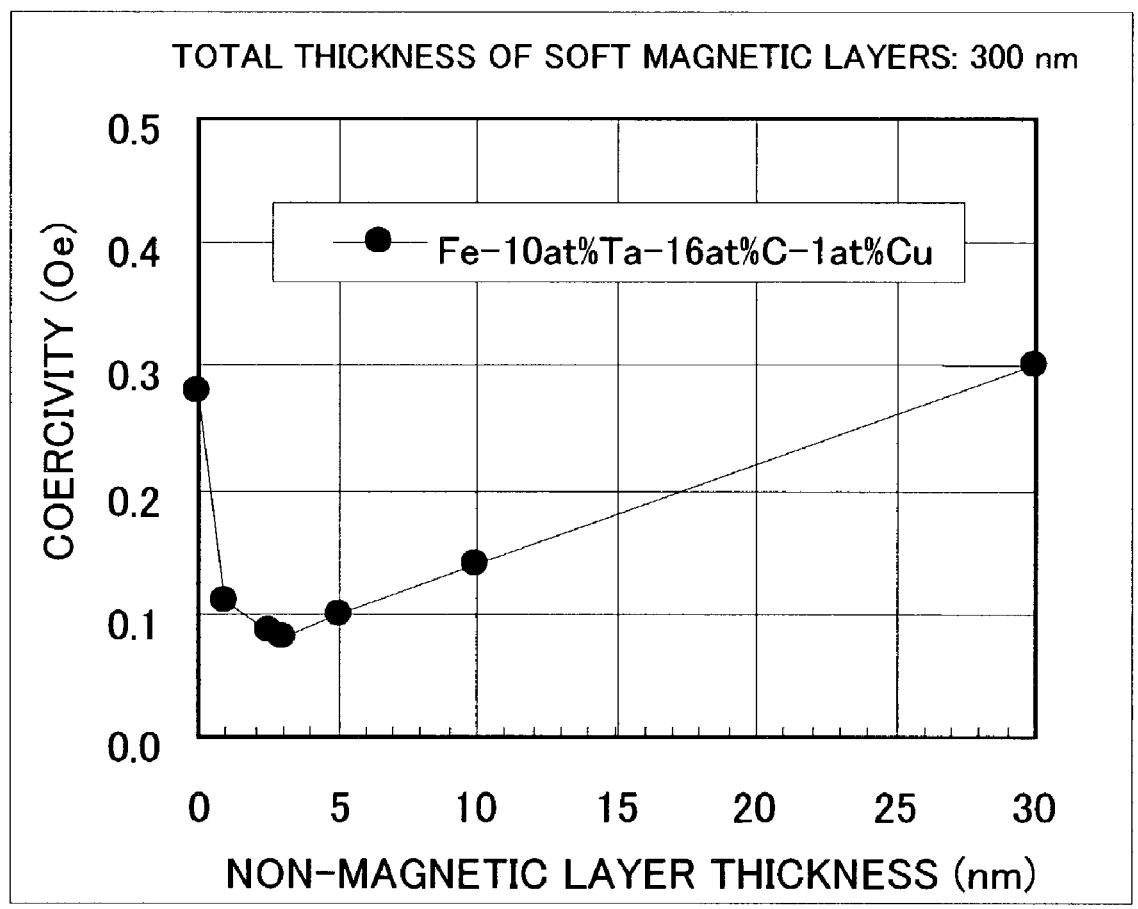
FIG. 10 is a characteristic graph showing the relationship between the coercivity of the soft magnetic underlayer and the film thickness of the non-magnetic layer, in the perpendicular recording medium according to the first embodiment.

FIGS. 9(a), 9(b), 9(c), and 9(d) are the spike noise maps of the media according to the present invention, of which the film thickness of the non-magnetic layer 14 has been changed. When the film thickness of the non-magnetic layer is reduced, the spike noise tends to decrease. The reason for this can be considered to an increase in the interlayer magnetostatic interaction between the soft magnetic layers: as the film thickness of the non-magnetic layer is reduced, the interlayer magnetostatic interaction between the soft magnetic layers increases, thereby strengthening the double-layer effect of forming the local magnetic loops. FIG. 10 shows the relationship between the coercivity of the soft magnetic underlayer and the film thickness of the non-magnetic layer. The coercivity values were measured along the easy axis of magnetization. Even if the film thickness of the non-magnetic layer is thin like 1 nm, the coercivity is greatly reduced, implying that the interlayer magnetostatic interaction works. When the film thickness of the non-magnetic layer is increased to be more than 3 nm, the coercivity tends to increase. The reason for this is considered to be a decrease in the interlayer magnetostatic interaction. Accordingly, in order to effectively utilize the interlayer magnetostatic interaction between the soft magnetic layers and suppress the spike noise, it is preferable that the film thickness of the non-magnetic layer is set to be a range from 1 nm to 3 nm.

As described above, by employing the bi-layer film as the soft magnetic underlayer formed through the non-magnetic layer, the spike noise and modulation of the read output can be reduced.

Second Embodiment

Figure 11:
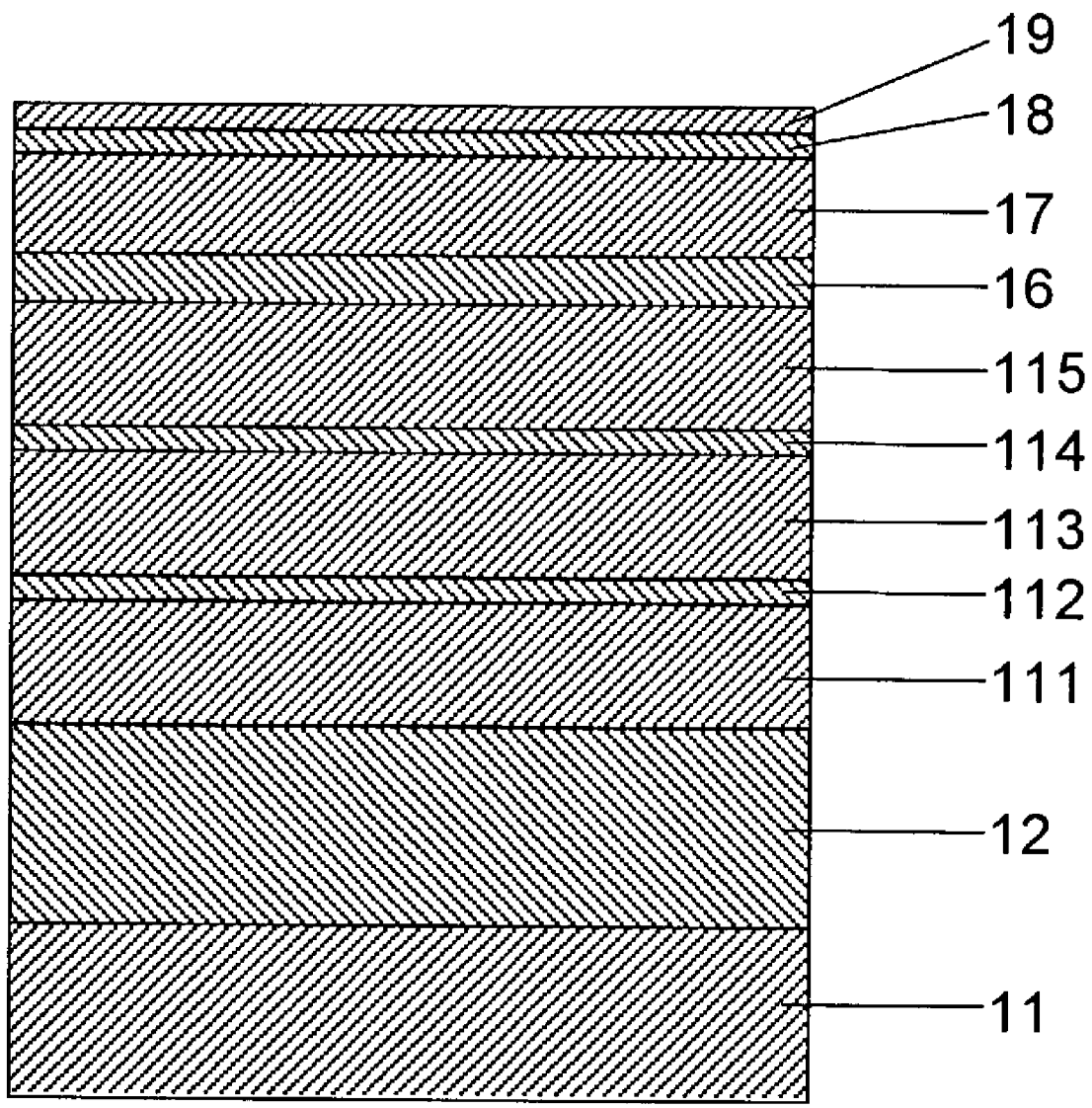
FIG. 11 is a sectional view showing a layer configuration of a perpendicular recording medium according to a second embodiment of the present invention.
Figure 12:
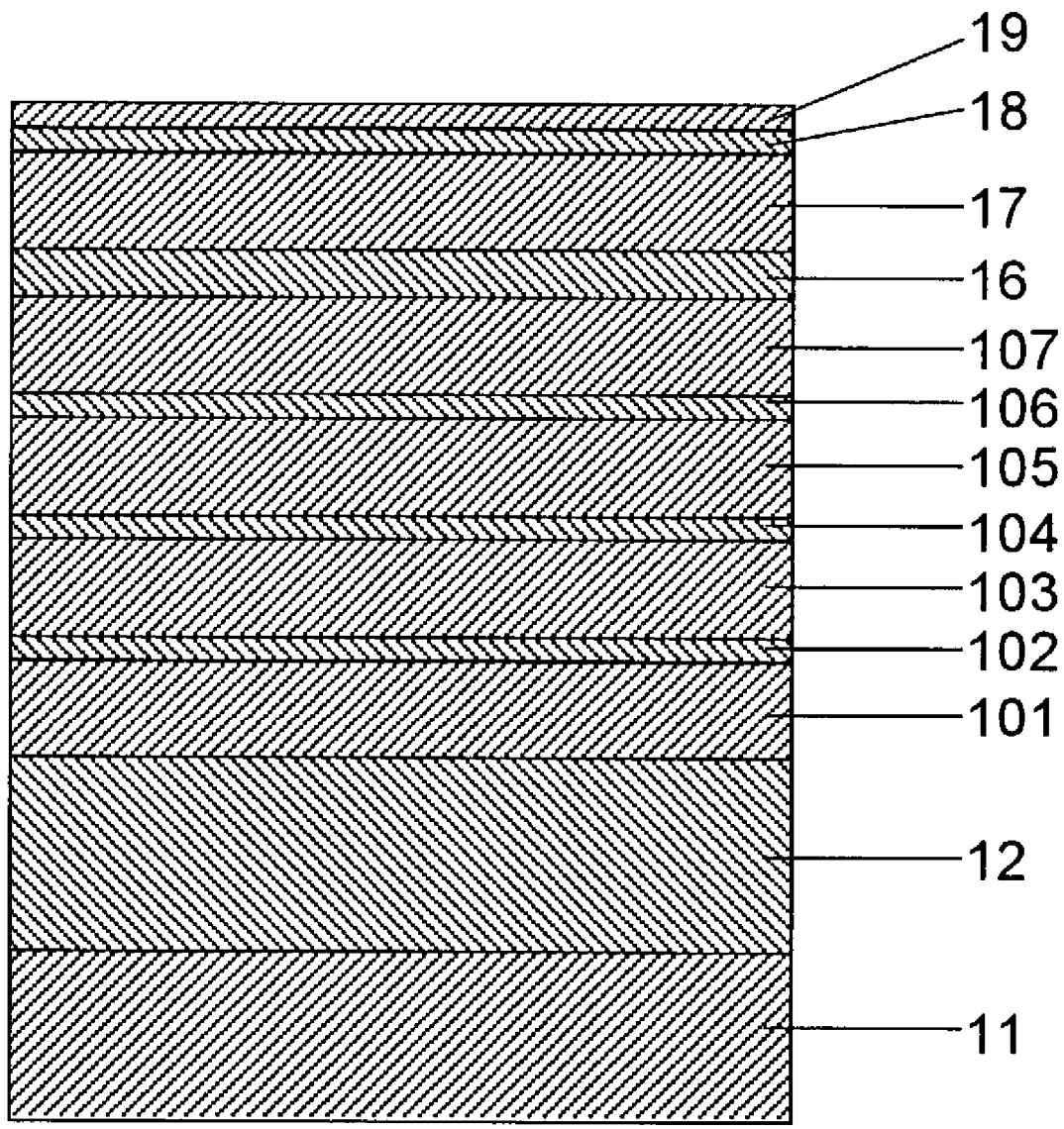
FIG. 12 is a sectional view showing a layer configuration of the perpendicular recording medium according to the second embodiment of the present invention.

Magnetic recording media were fabricated by the procedure similar to the procedure in the first embodiment. In addition to the bi-layer film described in the first embodiment, a tri-layer film (shown in FIG. 11) and a quad-layer film (shown in FIG. 12) were employed as the soft magnetic underlayers. As comparison examples, media with their soft magnetic layers formed of amorphous materials were fabricated. Table 3 shows target compositions employed for formation of the respective layers, while Table 4 shows the layer configurations and the film thicknesses of the respective layers of the media according to this embodiment and the comparison example media.

TABLE 3

| | Target composition |
|---|---|
| Pre-coat layer | Ni-37.5 at % Ta-10 at % Zr |
| Soft magnetic layer | Fe-10 at % Nb-16 at % C |
| | Fe-12 at % Ti-18 at % C |
| | Fe-10 at % Ta-16 at % C-1 at % Cu |
| | Fe-28 at % Co-20 at % B |
| Non-magnetic layer | Ta |
| | Ni-37.5 at % Nb-10 at % Zr |
| | Ni-37.5 at % Ta-10 at % Zr |
| Intermediate layer | Ni-37.5 at % Ta-10 at % Zr |
| | Co-40 at % Cr |
| Perpendicular rec. layer | Co-22 at % Cr-14 at % Pt |
| | Co-17 at % Cr-14 at % Pt-4 at % B |
| Protective layer | Carbon |

TABLE 4

| | Media | Pre-coat layer (nm) | Soft magnetic underlayer (nm) | Intermediate layer (nm) | Perpendicular rec. layer (nm) | Protective layer (nm) |
|---|---|---|---|---|---|---|
| Comparison 2 | A | NiTaZr (100) | FeNbC (300) | NiTaZr (2)/CoCr (3) | CoCrPtB (20) | C (5) |
| Embodiment 2 | B | NiTaZr (100) | FeNbC (150)/Ta (2.5)/FeNbC (150) | NiTaZr (2)/CoCr (3) | CoCrPtB (20) | C (5) |
| | C | NiTaZr (100) | FeNbC (100)/Ta (2.5)/FeNbC (100)/Ta (2.5)/FeNbC (100) | NiTaZr (2)/CoCr (3) | CoCrPtB (20) | C (5) |
| | D | NiTaZr (100) | FeNbC (75)/Ta (2.5)/FeNbC (75)/Ta (2.5)/FeNbC (75)/Ta (2.5)/FeNbC (75) | NiTaZr (2)/CoCr (3) | CoCrPtB (20) | C (5) |

TABLE 4-continued

| | Media | Pre-coat layer (nm) | Soft magnetic underlayer (nm) | Intermediate layer (nm) | Perpendicular rec. layer (nm) | Protective layer (nm) |
|---|---|---|---|---|---|---|
| Comparison 2 | E | NiTaZr (100) | FeTiC (300) | NiTaZr (5) | CoCrPt (20) | C (5) |
| Embodiment 2 | F | NiTaZr (100) | FeTiC (150) NiNbZr (2.5)/FeTiC (150) | NiTaZr (5) | CoCrPt (20) | C (5) |
| | G | NiTaZr (100) | FeTiC (100)/NiNbZr (2.5)/FeTiC (100)/NiNbZr (2.5)/FeTiC (100) | NiTaZr (5) | CoCrPt (20) | C (5) |
| | H | NiTaZr (100) | FeTiC (75)/NiNbZr (2.5)/FeTiC (75)/NiNbZr (2.5)/FeTiC (75) NiNbZr (2.5)/FeTiC (75) | NiTaZr (5) | CoCrPt (20) | C (5) |
| Comparison 2 | I | NiTaZr (100) | FeTaCCu (300) | NiTaZr (5) | CoCrPt (20) | C (5) |
| Embodiment 2 | J | NiTaZr (100) | FeTaCCu (150)/Ta (2.5)/FeTaCCu (150) | NiTaZr (5) | CoCrPt (20) | C (5) |
| | K | NiTaZr (100) | FeTaCCu (100)/Ta (2.5)/FeTaCCu (100)/Ta (2.5)/FeTaCCu (100) | NiTaZr (5) | CoCrPt (20) | C (5) |
| | L | NiTaZr (100) | FeTaCCu (75)/Ta (2.5)/FeTaCCu (75)/Ta (2.5)/FeTaCCu (75)/Ta (2.5)/FeTaCCu (75) | NiTaZr (5) | CoCrPt (20) | C (5) |
| Comparison 2 | M | NiTaZr (100) | FeCoB (300) | NiTaZr (5) | CoCrPt (20) | C (5) |
| | N | NiTaZr (100) | FeCoB (150)/NiTaZr (2.5)/FeCoB (150) | NiTaZr (5) | CoCrPt (20) | C (5) |
| | O | NiTaZr (100) | FeCoB (100)/NiTaZr (2.5)/FeCoB (100)/NiTaZr (2.5)/FeCoB (100) | NiTaZr (5) | CoCrPt (20) | C (5) |
| | P | NiTaZr (100) | FeCoB (75)/NiTaZr (2.5)/FeCoB (75)/NiTaZr (2.5)/FeCoB (75) | NiTaZr (5) | CoCrPt (20) | C (5) |
| Embodiment 2 | Q | NiTaZr (100) | FeNbC (60)/Ta (2.5)/FeNbC (60)/Ta (2.5)/FeNbC (60) | NiTaZr (2)/CoCr (3) | CoCrPtB (20) | C (5) |

Numbers in parentheses indicate the thickness of each layer.

The formation temperature of α-Fe nanocrystals differs according to the material employed for the soft magnetic layer. Thus, by adjusting power to the infrared lamp heater, the annealing condition was adjusted. The Bs of the soft magnetic underlayer after annealing was 1.4 to 1.5 T and the peak substrate temperature during annealing was approximately 380° C. when the FeNbC alloy was employed. The Bs of the soft magnetic underlayer was 1.3 to 1.4T and the peak substrate temperature was approximately 360° C. when the FeTic alloy was employed. The Bs of the soft magnetic underlayer was 1.6 to 1.7T and the peak substrate temperature was approximately 400° C. when an FeTaCCu alloy was employed.

Figure 13:
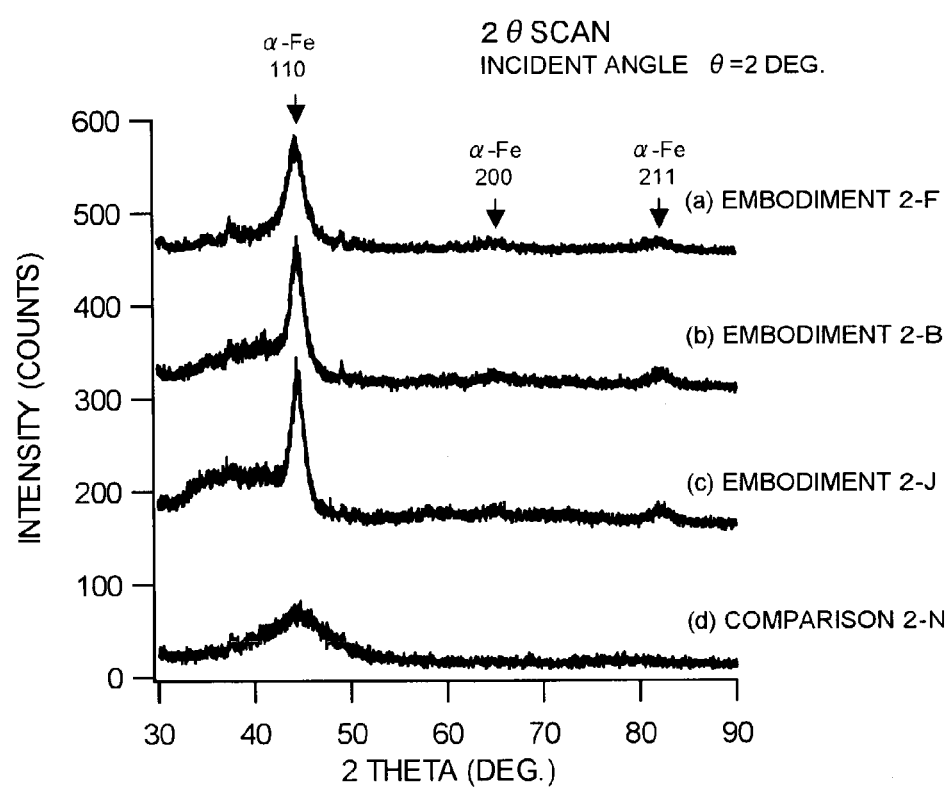
FIG. 13 shows characteristic graphs indicating thin-film X-ray diffraction patterns (2θ scan) of media in the second embodiment and a comparison example medium.

FIG. 13 shows results of examination of the microstructures of the soft magnetic layers of a comparison example medium and the media in this embodiment using a thin film X-ray diffraction method (2θ scan). An X-ray incident angle θ relative to the surfaces of the samples was set to two degrees. In the soft magnetic layers in this embodiment, α-Fe 110, 200, and 211 diffraction peaks of the bcc structure were identified. This result shows that the soft magnetic layers are constituted by α-Fe nanocrystals and that the crystallographic orientation of the crystals is not aligned in a specific direction. On the other hand, it can be confirmed that the FeCoB alloy of the comparison example medium is amorphous.

Figure 14:
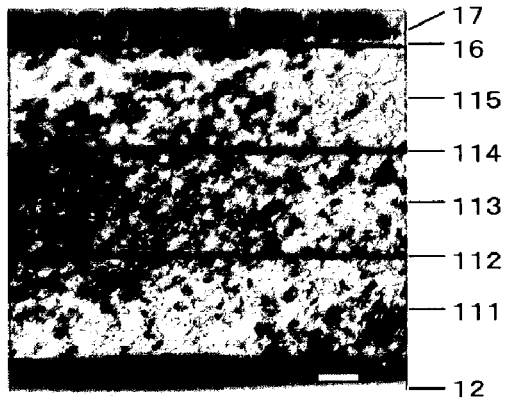
FIG. 14(a) shows a bright-field image of a medium section observed by a TEM.
FIG. 14(b) is a characteristic diagram showing an electron diffraction pattern.
Figure 14:
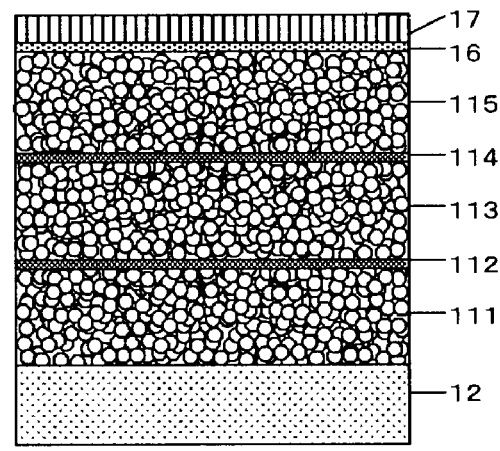
Figure 14:
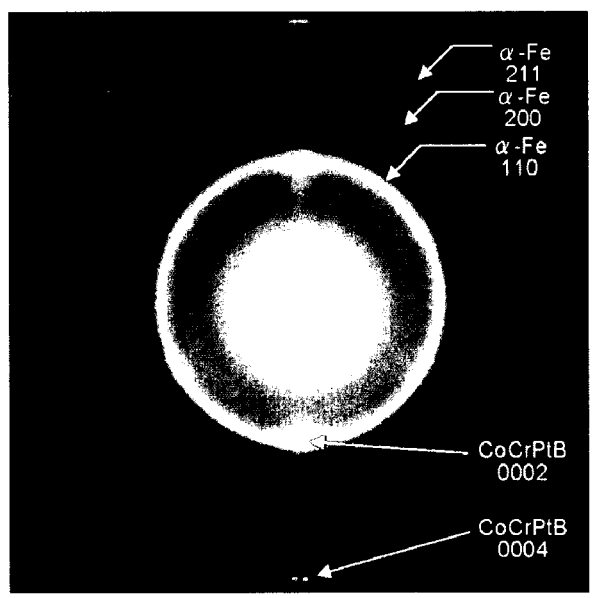
Figure 14:
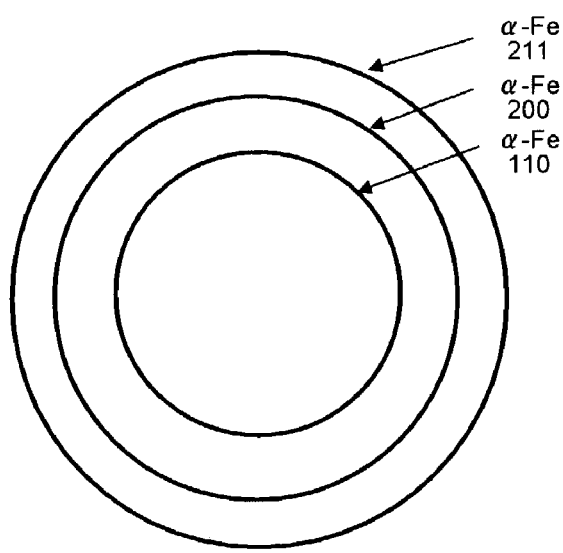
Figure 15:
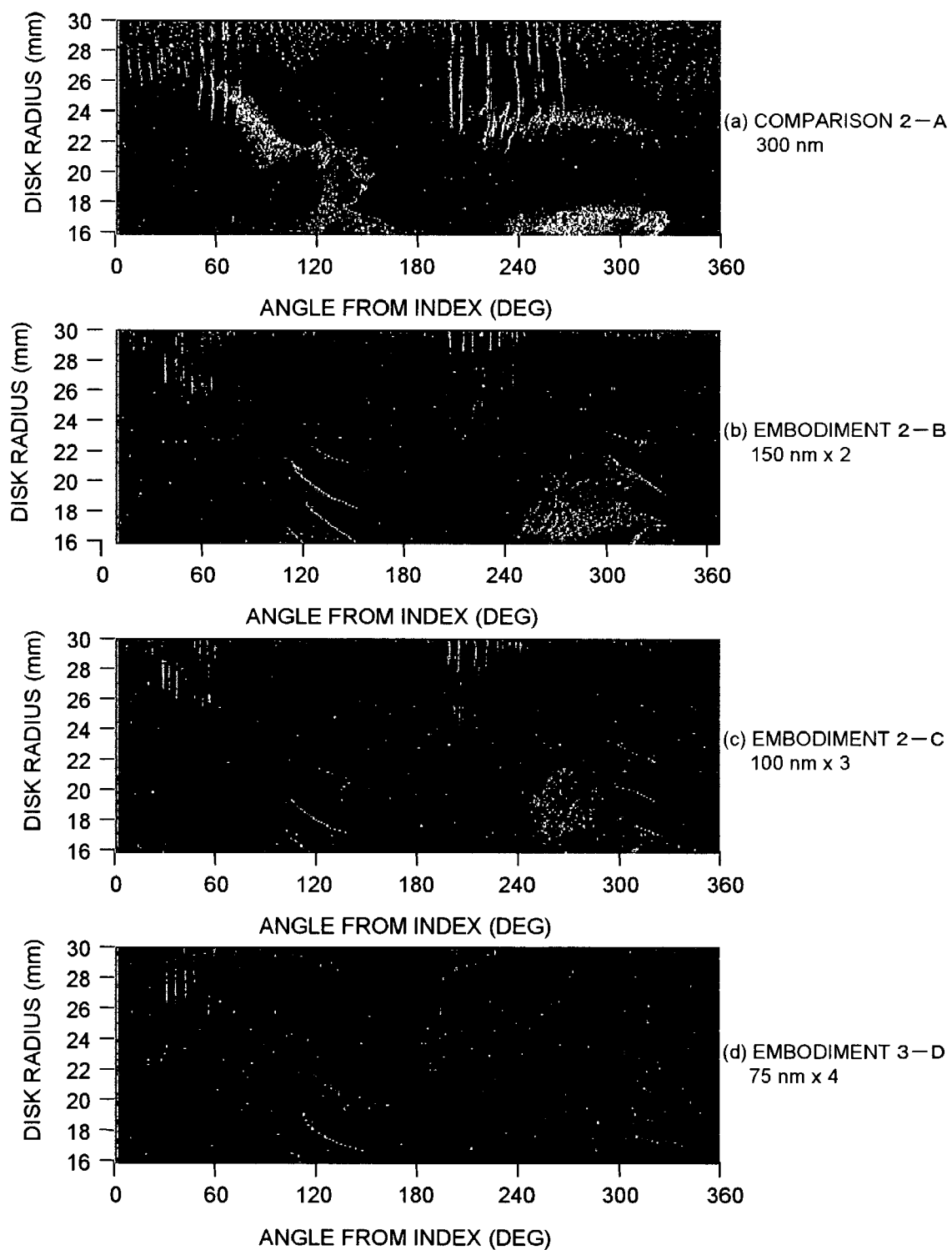
FIGS. 15(a), 15(b), 15(c), and 15(d) are characteristic diagrams showing spike noise distributions of a comparison example medium and media in the second embodiment, respectively.
Figure 16:
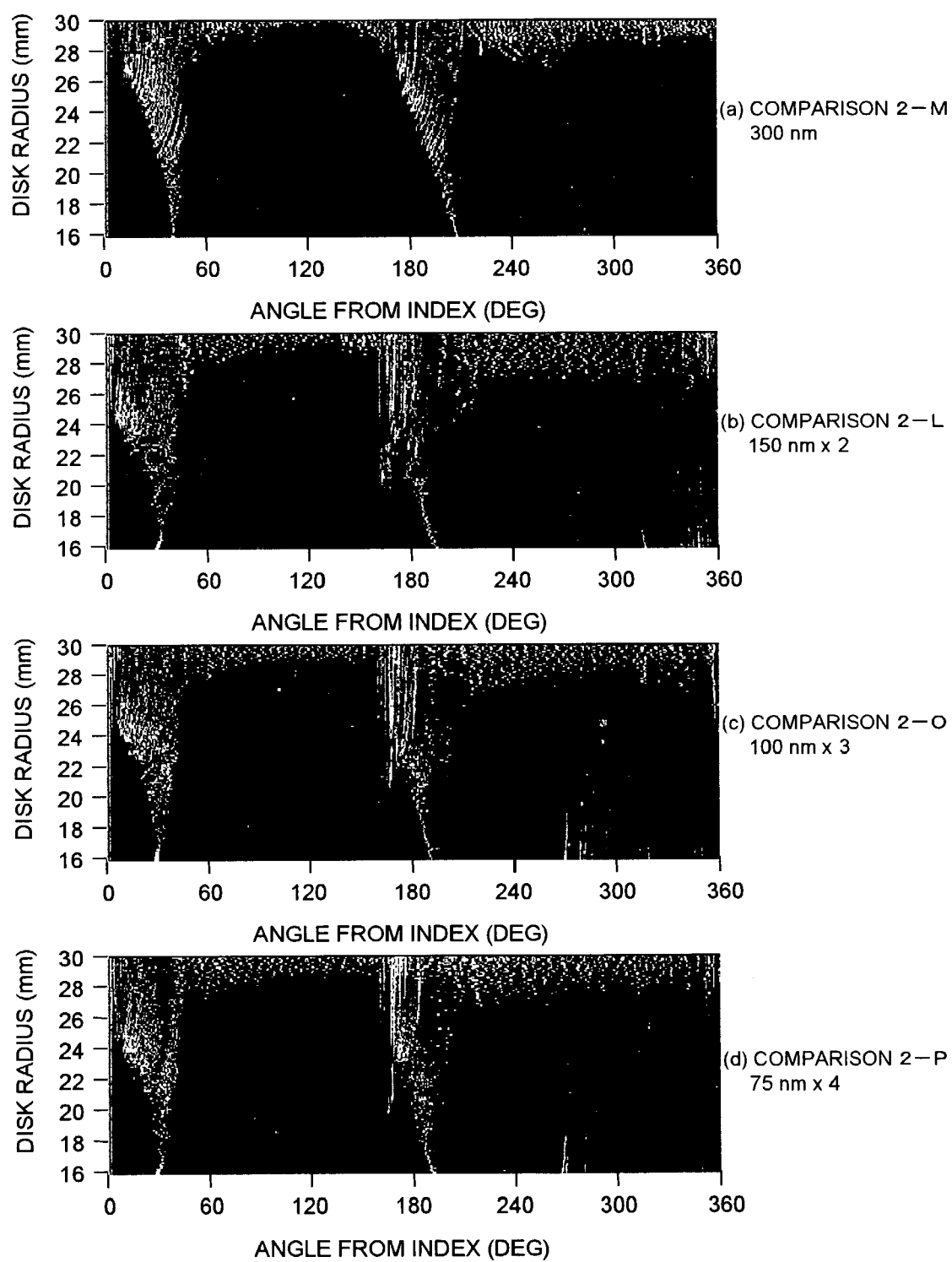
FIGS. 16(a), 16(b), 16(c), and 16(d) are characteristic diagrams showing spike noise distributions of comparison example media in the second embodiment.

FIGS. 14(a) and 14(b) show results of observation of the microstructure of the medium in this embodiment by a Transmisson Electron Microscope (TEM). FIGS. 14(a)' and 14(b)' are schematic diagrams of these results. Herein, a medium Q where the FeNbC alloy is employed for the soft magnetic layers and Ta is employed for the non-magnetic layer is shown by way of an example. In FIG. 14(a) showing a bright-field image obtained by observation of a section of the medium, there can be seen three soft magnetic layers constituted by non-columnar nanocrystals shown in FIG. 14(a)' having their grain diameter of approximately 10 nm and non-magnetic layers by which the respective soft magnetic layers are separated. In an electron diffraction pattern in FIG. 14(b) in the same field of view as for this bright-field image, α-Fe 110, 200, and 211 diffraction rings of the bcc structure, shown in FIG. 14(b)' are observed. From these images and diagrams, it is also seen that the crystallographic orientation of the α-Fe nanocrystals that constitute the soft magnetic layers is not aligned in the specific direction, and is generally random. This result conforms to the result of the thin film X-ray diffraction analysis described above.

Figure 17:
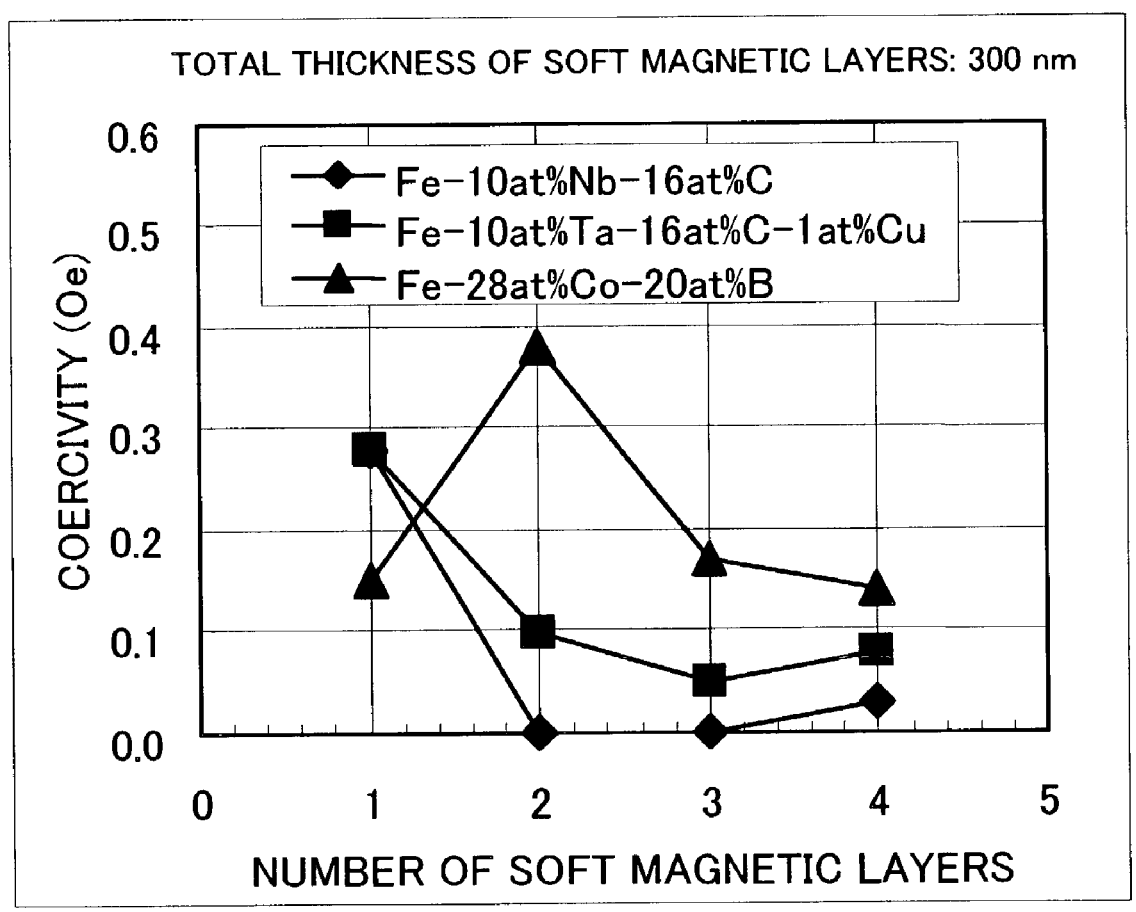
FIG. 17 show characteristic graphs indicating relationships between the coercivity of the soft magnetic underlayer and the number of layers for the soft magnetic layers.

FIGS. 15(a), 15(b), 15(c), and 15(d) are spike noise maps of a comparison example medium and the media in this embodiment. It can be seen that by forming the multilayer soft magnetic underlayer, the spike noise is reduced. Herein, media A, B, C, and D, where the FeNbC alloy was employed as the soft magnetic layer material, were shown. However, the similar tendency was observed in media E, F, G, H that used the FeTic alloy, and media I, J, K, and L that used the FeTaCCu alloy. On the other hand, in the comparison example media, even if the multilayer soft magnetic underlayer is formed, the spike noise is not reduced, as shown in FIGS. 16(a), 16(b), 16(c), and 16(d). These results demonstrate that when the soft magnetic underlayer is formed of multiple amorphous soft magnetic layers, the spike noise is not always reduced. Further, as shown in FIG. 17, the coercivity of the soft magnetic underlayers in this embodiment, when formed of multiple layers, tends to be greatly reduced. The coercivity of the soft magnetic underlayers in the comparison example media, however, does not tend to be reduced. Accordingly, it can be considered that, in the soft magnetic underlayers of the comparison example media, the interlayer magnetostatic interaction has not worked efficiently, so that the spike noise is not reduced.

From the foregoing description, it can be seen that, in order to reduce the spike noise through the interlayer magnetostatic interaction between the soft magnetic layers, use of the soft magnetic layers having the structure with the α-Fe crystals thereof generally formed in a random manner is effective.

Third Embodiment

Magnetic recording media were fabricated by the procedure similar to the procedure in the first embodiment. A tri-layer film (shown in FIG. 11) and a quad-layer film (shown in FIG. 12) were employed as the soft magnetic underlayers. A medium of which a single-layer film was employed as the soft magnetic layer, shown in FIG. 2 was fabricated as a comparison example. Table 5 shows target compositions employed for formation of the respective layers, while Table 6 shows the layer configurations and the film thicknesses of the respective layers of the media according to this embodiment and the comparison example medium.

TABLE 5

| | Target composition |
|---|---|
| Pre-coat layer | Ni-37.5 at % Ta-10 at % Zr Ta |
| Soft magnetic layer | Fe-8 at % Ta-12 at % C |
| Non-magnetic layer | Ta |
| Intermediate layer | Ni-37.5 at % Ta-10 at % Zr Co-40 at % Cr |
| Perpendicular rec. layer | Co-22 at % Cr-14 at % Pt Co-17 at % Cr-14 at % Pt-4 at % B |
| Protective layer | Carbon | medium. From these maps, it can be seen that, by employing the tri-layer film or the quad-layer film as the soft magnetic underlayer, the spike noise is greatly reduced. When the film of the soft magnetic underlayer is thick like 400 nm as in this embodiment, in particular, an increase in the number of the soft magnetic layers for forming the soft magnetic underlayer is effective in reducing the spike noise.

It is feared that when a multilayer structure formed through the non-magnetic layer is employed as the soft magnetic underlayer, the ability of the medium to help writing by the magnetic head is degraded, so that read/write characteristics would deteriorate. Then, the read/write characteristics were evaluated using the single-pole type head having a 0.25 μm track width for recording and a GMR head with a 0.07 μm shield gap and a 0.16 μm track width for reproduction and under the condition of the head flying height being 10 nm. When the magnetic characteristics of the perpendicular recording layers of the media in this embodiment and the perpendicular recording layer of the comparison example medium were measured by a Kerr-effect magnetometer, the coercivities of the media were 3.95–4.05 kOe, and squarenesses of the media were 0.98–0.99: there was not seen a noticeable difference between the perpendicular recording layers in this embodiment and the perpendicular recording layer of the comparison example.

Figure 20:
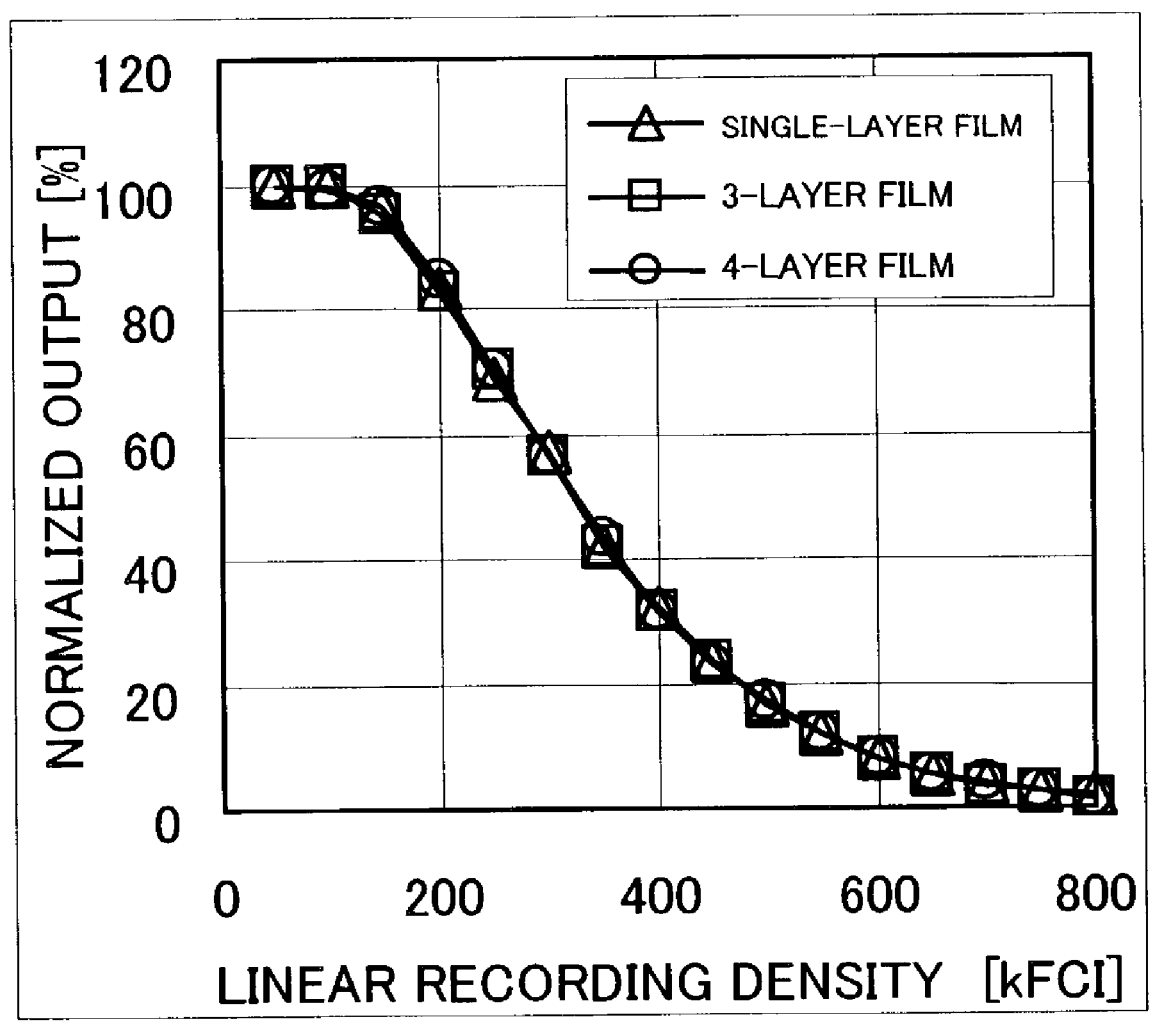
FIG. 20 shows characteristic graphs indicating relationships between normalized output and linear recording density.
Figure 21:
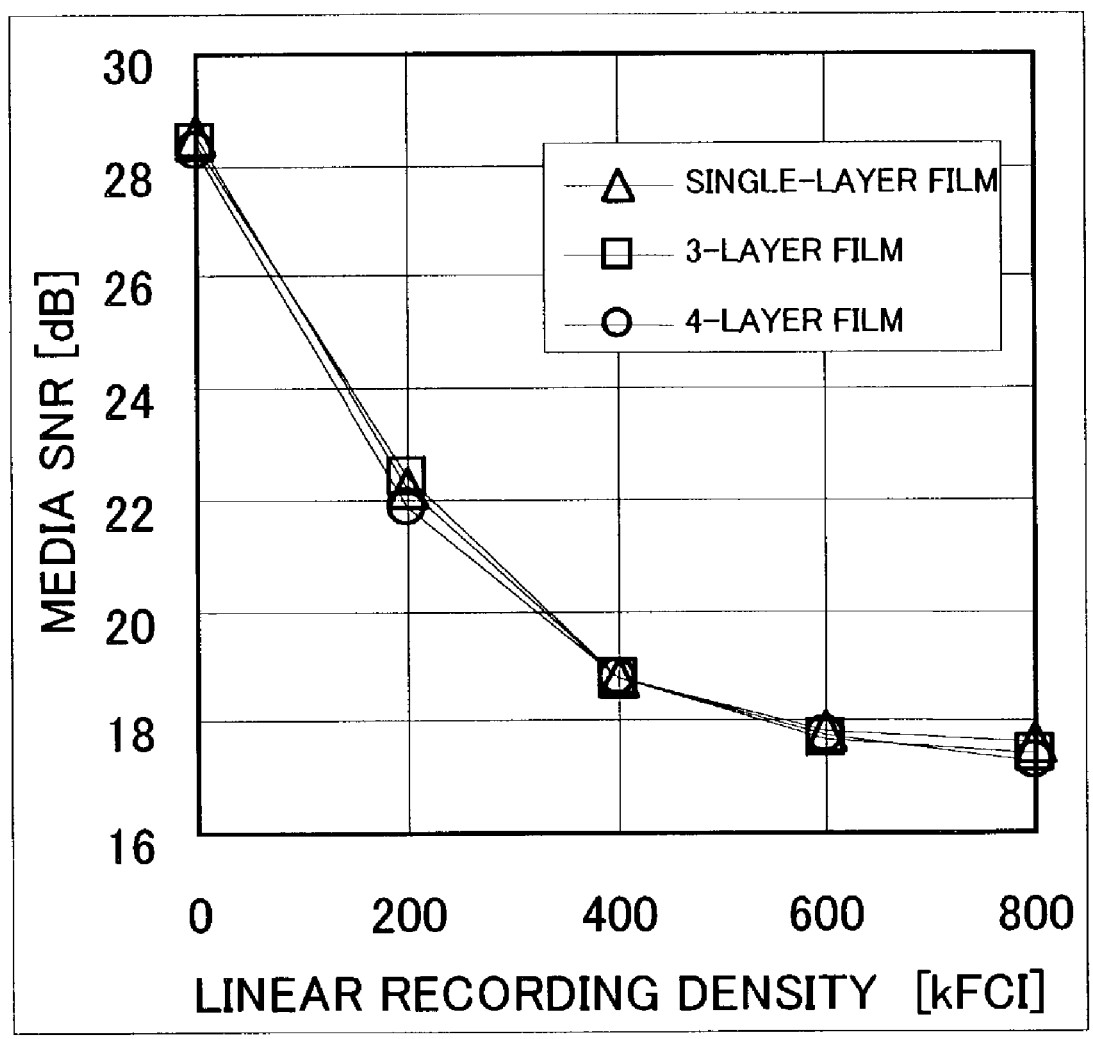
FIG. 21 shows characteristic graphs indicating relationships between medium SNR (S/N ratio) and the linear recording density.

FIGS. 20 and 21 show the dependence of the read output on the linear recording density and the dependence of a medium SNR (S/N ratio) on the linear recording density, respectively. Even if the soft magnetic underlayer was formed of multiple layers, an output resolution and the medium SNR are not reduced, demonstrating that the ability of the medium to help writing by the magnetic head is not degraded. This is because the non-magnetic layer employed for the soft underlayer in this embodiment has the thin film thickness of 2.5 nm. This is also because since the number

TABLE 6

| Media | Pre-coat layer (nm) | Soft magnetic underlayer (nm) | Intermediate layer (nm) | Perpendicular rec. layer (nm) | Protective layer (nm) |
|---|---|---|---|---|---|
| Comparison 3 | A | NiTaZr (100)/ Ta (2.5) | FeTaC (400) | NiTaZr (2)/ CoCr (3) | CoCrPtB (20) | C (5) |
| Embodiment 3 | B | NiTaZr (100)/ Ta (2.5) | FeTaC (133)/Ta (2.5)/ FeTaC (133) | NiTaZr (2)/ CoCr (3) | CoCrPtB (20) | C (5) |
| | C | NiTaZr (100)/ Ta (2.5) | FeTaC (100)/Ta (2.5)/ FeTaC (100)/Ta (2.5)/ FeTaC (100)/Ta (2.5)/ FeTaC (100) | NiTaZr (2)/ CoCr (3) | CoCrPtB (20) | C (5) |

Numbers in parentheses indicate the thickness of each layer.

Figure 18:
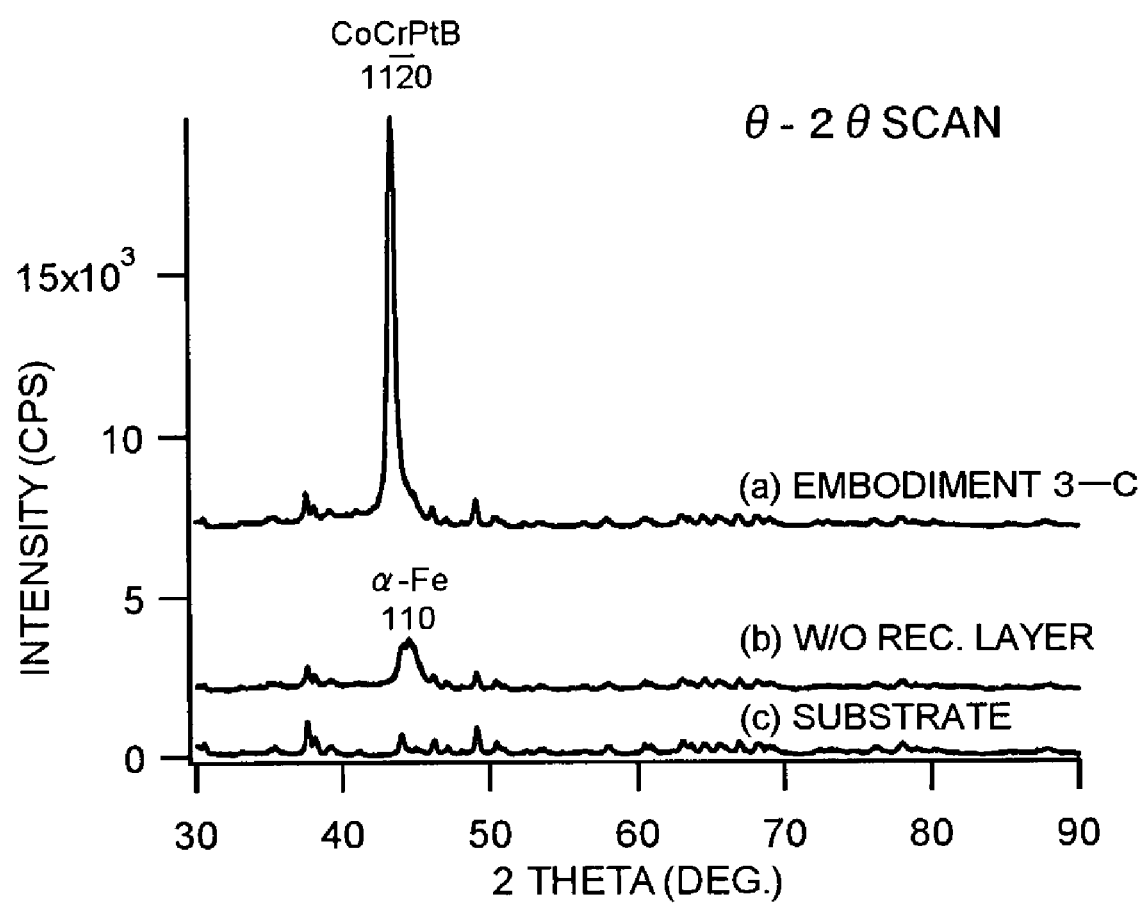
FIG. 18 shows characteristic graphs indicating (θ-2θ scan) X-ray diffraction patterns of a medium in a third embodiment of the present invention.

FIG. 18 shows the X-ray diffraction pattern of a medium C in this embodiment, which has been subject to a θ-2θ scan. A strong diffraction peak is confirmed from a CoCrPtB (0002) plane, and $\Delta\theta_{50}$ at the CoCrPtB 0002 diffraction peak determined from the θ scan is 4.4 degrees, which is a small value. In this manner, a c axis of a CoCrPtB alloy film employed as the perpendicular recording layer is strongly perpendicular oriented.

Figure 19:
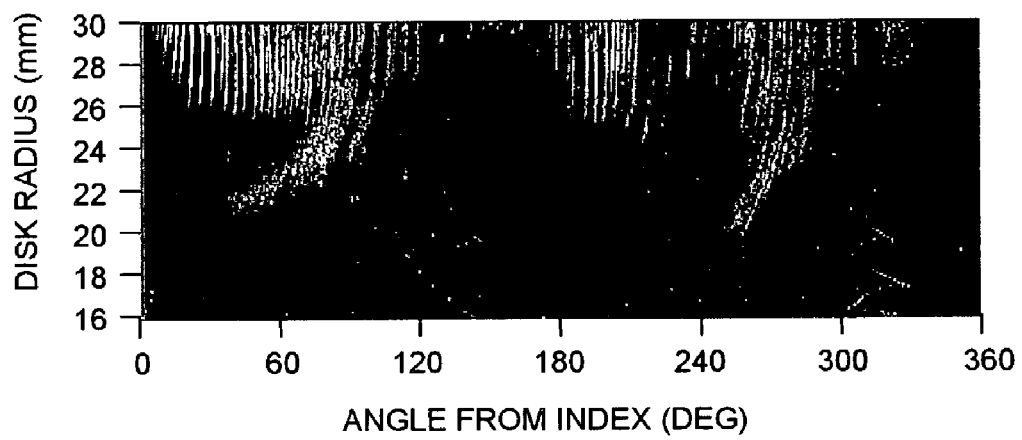
FIGS. 19(a), 19(b), and 19(c) are characteristic diagrams showing spike noise distributions of a comparison example medium and media in the third embodiment, respectively.
Figure 19:
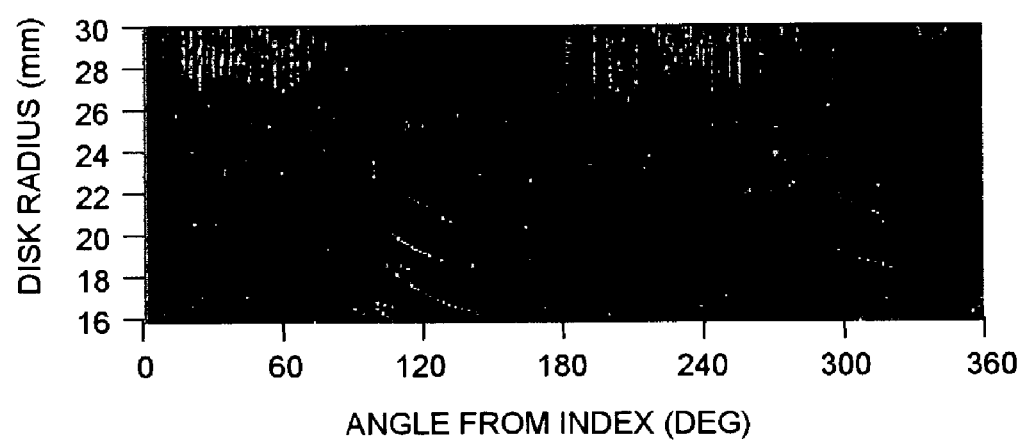
Figure 19:
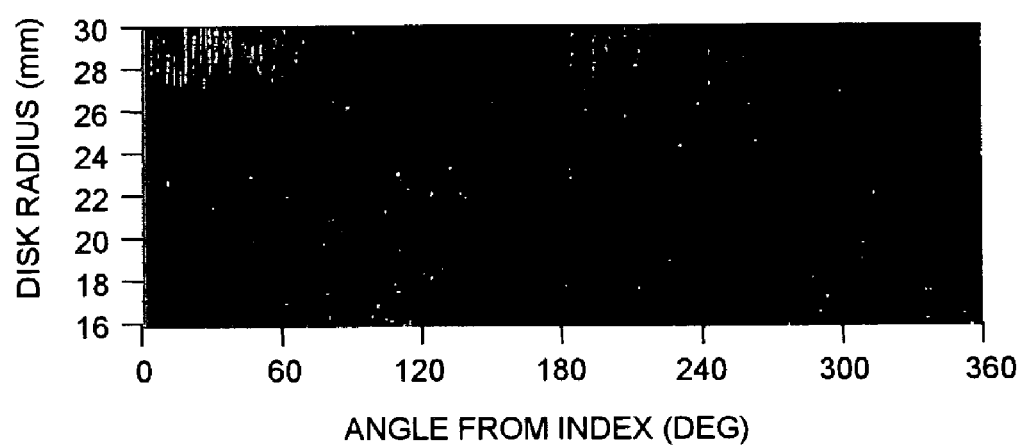

FIGS. 19(a), 19(b), and 19(c) are spike noise maps of the media in this embodiment and the comparison example of the non-magnetic layers is small, a reduction in the magnetic permeability of the soft magnetic underlayer due to the multilayer structure is very small.

Figure 22:
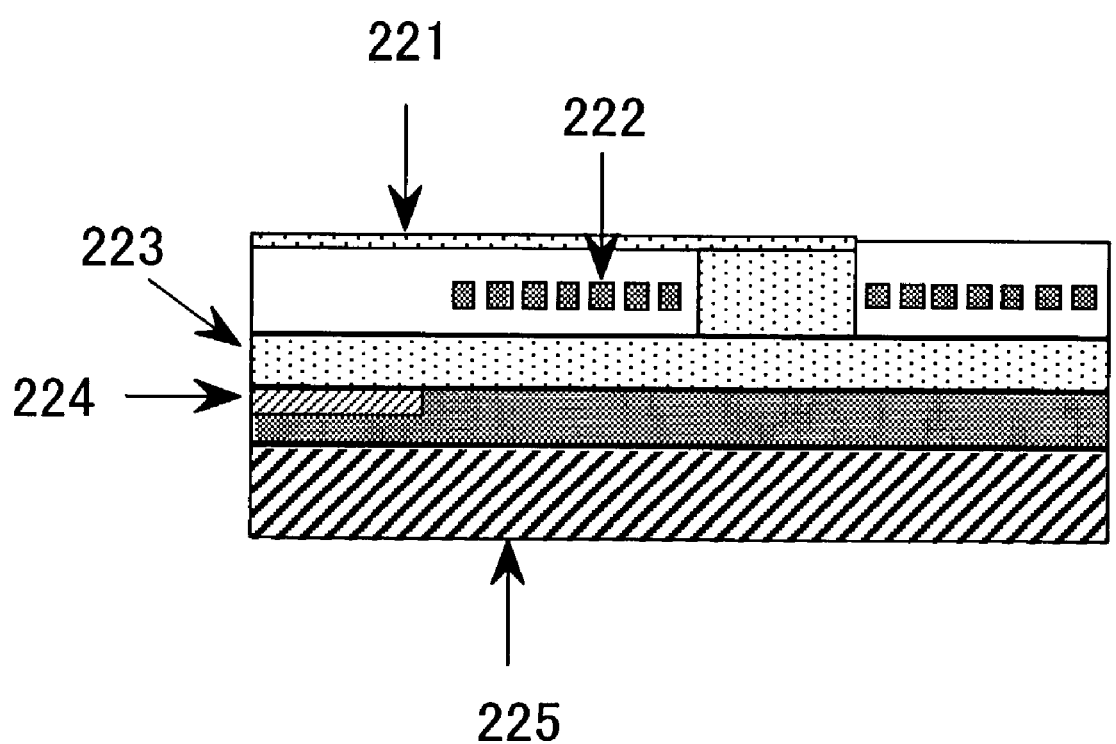
FIG. 22 is a sectional view of a recording/reproduction-separation-type head.

In other words, it is considered that the same write magnetic field profile was obtained as in the case where a single-layer film soft magnetic underlayer was employed, so that the output resolution and the medium SNR are not reduced. Incidentally, as shown in FIG. 22, a recording/reproduction-separation-type head used for this evaluation has a known structure that includes a main pole 221, recording coils 222, an auxiliary pole/upper shield 223, a GMR element 224, and a lower shield 225.

As described above, by employing the soft magnetic underlayer in this embodiment, the spike noise can be reduced without degrading the read/write characteristics, thereby allowing an improvement in the quality of an output signal.

Fourth Embodiment

A magnetic recording medium was fabricated by the procedure similar to the procedure used in the third embodiment, except for use of a PdB single-layer film as the intermediate layer and a CoB/Pd multilayer film as the perpendicular recording layer. The PdB single-layer film and the CoB/Pd multilayer film were formed at an $Ar/O_2$ atmosphere where a sputtering-gas pressure was 5.6 Pa and an oxygen partial pressure was 35 mPa. The quad-layer film shown in FIG. 12, described in the second and third embodiments was employed as the soft magnetic underlayer. Further, a medium using the single-layer film, shown in FIG. 2 was fabricated as a comparison example. Table 7 shows target compositions employed for formation of the respective layers, while Table 8 shows the layer configurations and the film thicknesses of the respective layers of the medium according to this embodiment and the comparison example medium.

TABLE 7

|  | Target composition |
|---|---|
| Pre-coat layer | Ni-37.5 at % Ta-10 at % Zr Ta |
| Soft magnetic layer | Fe-9 at % Ta-12 at % C |
| Non-magnetic layer | Ta |
| Intermediate layer | Pd-10 at % B |
| Perpendicular rec. layer | Co-15 at % B Pd |
| Protective layer | Carbon |

Figure 23:
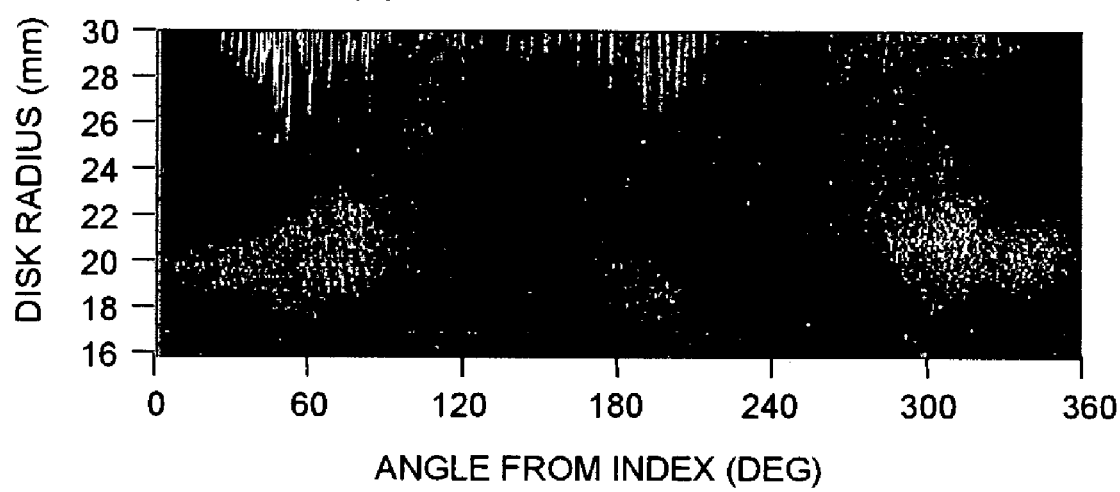
FIGS. 23(a) and 23(b) show characteristic diagrams indicating spike noise distributions of a comparison example medium and a medium in a fourth embodiment of the present invention.
Figure 23:
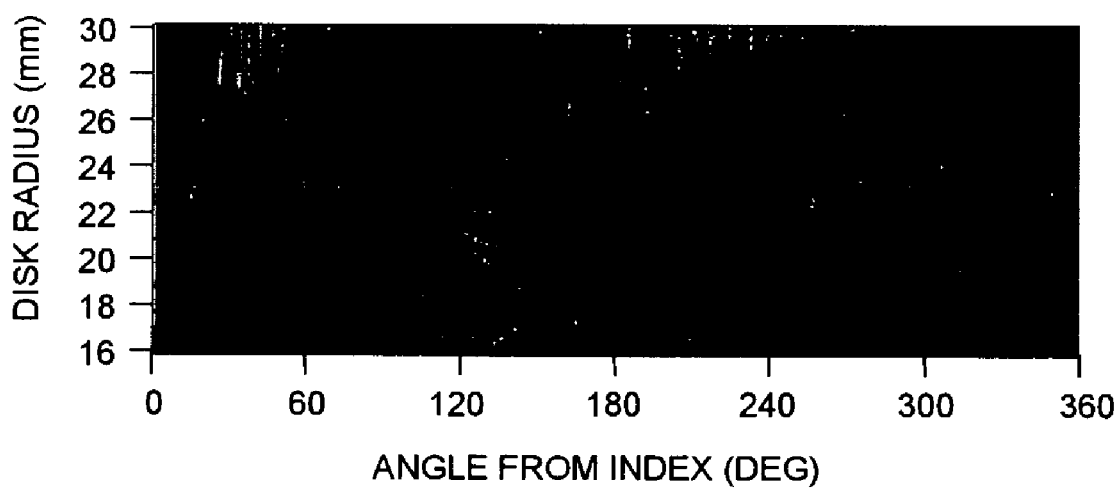

FIGS. 23(a) and 23(b) are spike noise maps of the comparison example medium and the medium in this embodiment, respectively. From these maps, it can be seen that even if a Co/Pd-multilayer-film-based material is employed for the perpendicular recording layer, by employing the soft magnetic underlayer of the multilayer structure formed through the non-magnetic layers in this embodiment, the spike noise can be reduced. In this manner, the soft magnetic underlayer according to the present invention does not limit a material for the perpendicular recording layer.

Next, in order to confirm that a deterioration in the read/write characteristics resulting from formation of the soft magnetic underlayer using multiple layers even if the coercivity of the perpendicular recording layer is approximately 6 kOe, which is a high value, the bit error rate of the medium in this embodiment and the bit error rate of the comparison example medium were measured. The measurements were performed using the single-pole-type head with the 0.25 µm track width for recording and the GMIR head with a 0.065 µm shield gap and the 0.16 µm track width for reproduction and under the condition of the head flying height being 10 nm. Further, in order to remove the influence of the spike noise on the bit error rate, in regard to the comparison example medium as well, evaluation was performed at the disk radius of 25 mn where no large spike noise was observed.

Figure 24:
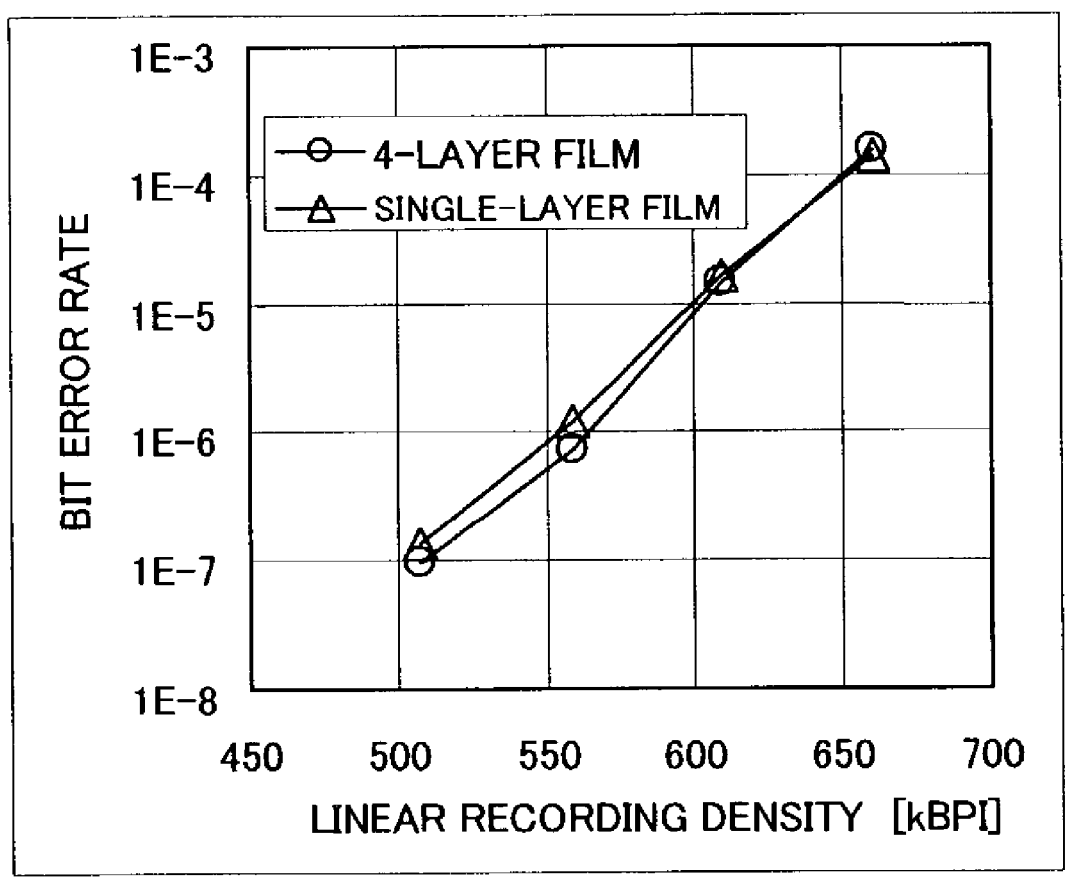
FIG. 24 shows characteristic graphs indicating relationships between bit error rate and the linear recording density.

FIG. 24 shows the dependence of the bit error rate on the linear recording density. From FIG. 24, it can be seen that even if the soft magnetic layer was formed of multiple layers, no noticeable difference in the bit error rate is not seen between the soft magnetic formed of multiple layers and the soft magnetic layer formed of a single layer, and recording/reproduction characteristics do not deteriorate. An error occurs with a high probability at a location where the spike noise is produced. Thus, when evaluation is performed on the entire disk, the lower bit error rate can be achieved with the medium in this embodiment than the comparison example medium.

As described above, according to the present invention, by employing the soft magnetic underlayer of a multilayer structure formed through the non-magnetic layer, even if the

TABLE 8

|  | Media | Pre-coat layer (nm) | Soft magnetic underlayer (nm) | Intermediate layer (nm) | Perpendicular rec. layer (nm) | Protective layer (nm) |
|---|---|---|---|---|---|---|
| Comparison 4 | A | NiTaZr (100)/ Ta (2.5) | FeTaC (500) | PdB (15) | [CoB (0.3/ Pd (1)] 15 | C (5) |
| Embodiment 4 | B | NiTaZr (100)/ Ta (2.5) | FeTaC (125)/Ta (2.5)/ FeTaC (125)/Ta (2.5)/ FeTaC (125)/Ta (2.5)/ FeTaC (125) | PdB (15) | [CoB (0.3)/ Pd (1)] 15 | C (5) |

Numbers in parentheses indicate the thickness of each layer.

When the magnetic characteristics of the perpendicular recording layer of the medium in this embodiment and the comparison example medium were measured by the Kerr-effect magnetometer, the coercivities of the perpendicular recording layer in this embodiment and the perpendicular recording layer of the comparison example were 5.85 kOe and 5.90 kOe, respectively, and squarenesses were both 1: there was not seen a noticeable difference between the perpendicular recording layer in this embodiment and the perpendicular recording layer of the comparison example.

Co/Pd-multilayer-film-based material is used from which the high coercivity of the perpendicular recording layer is obtained, the spike noise can be reduced without a deterioration in the recording/reproduction characteristics. The quality of an output signal can be thereby improved.

Fifth Embodiment

Figure 25:
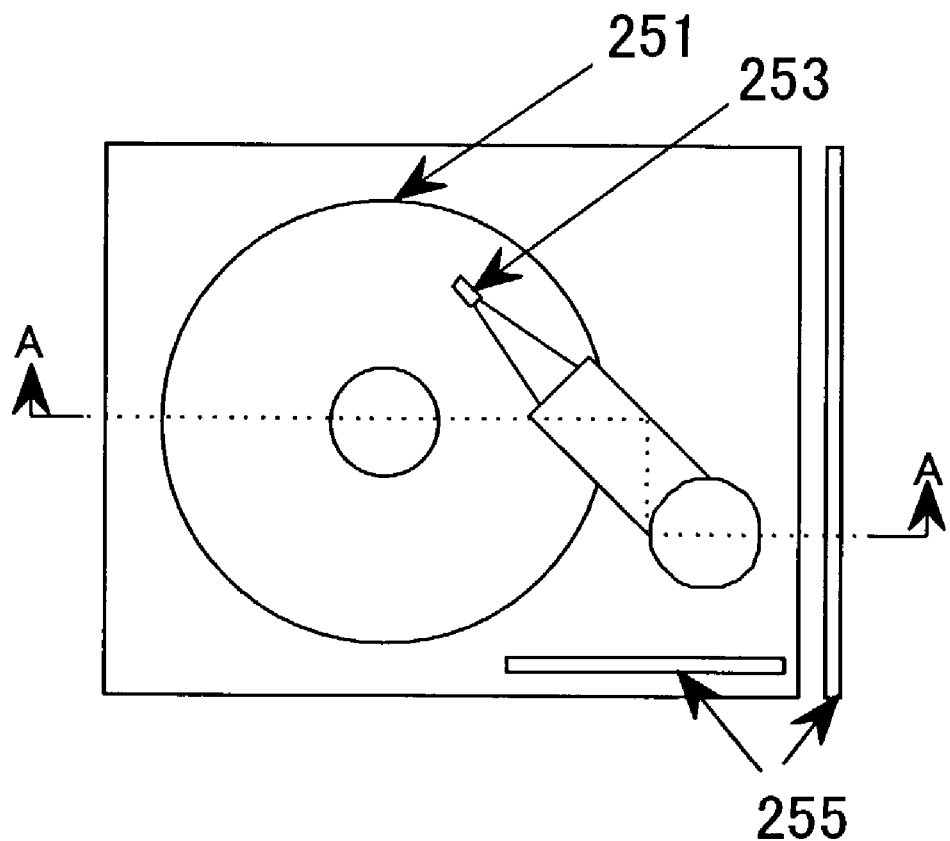
FIG. 25(a) is a schematic diagram showing a magnetic storage apparatus according to a fifth embodiment of the present invention.
FIG. 25(b) is a vertical sectional diagram of the magnetic recording apparatus through a line A–A'.
Figure 25:
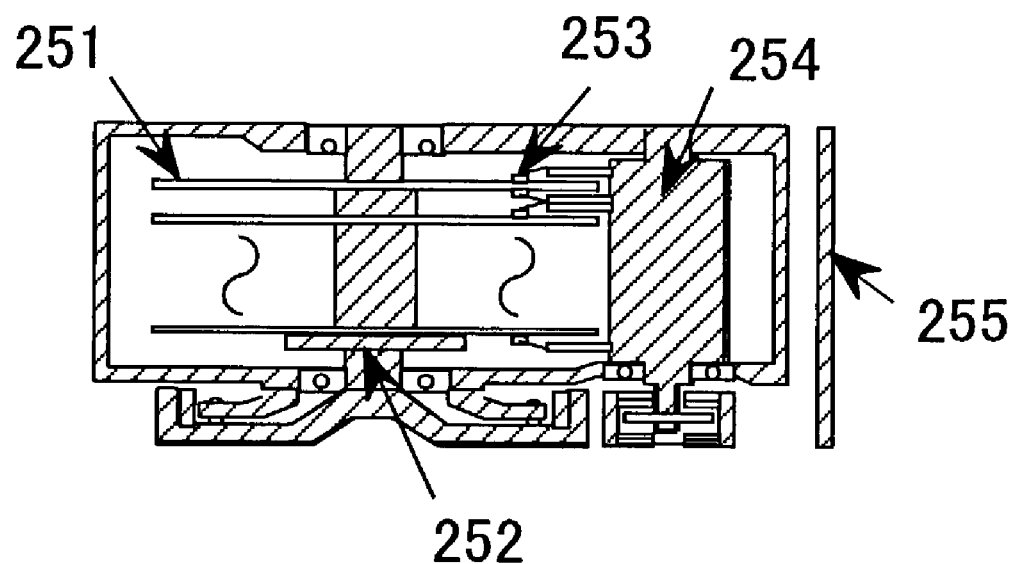
Figure 26:
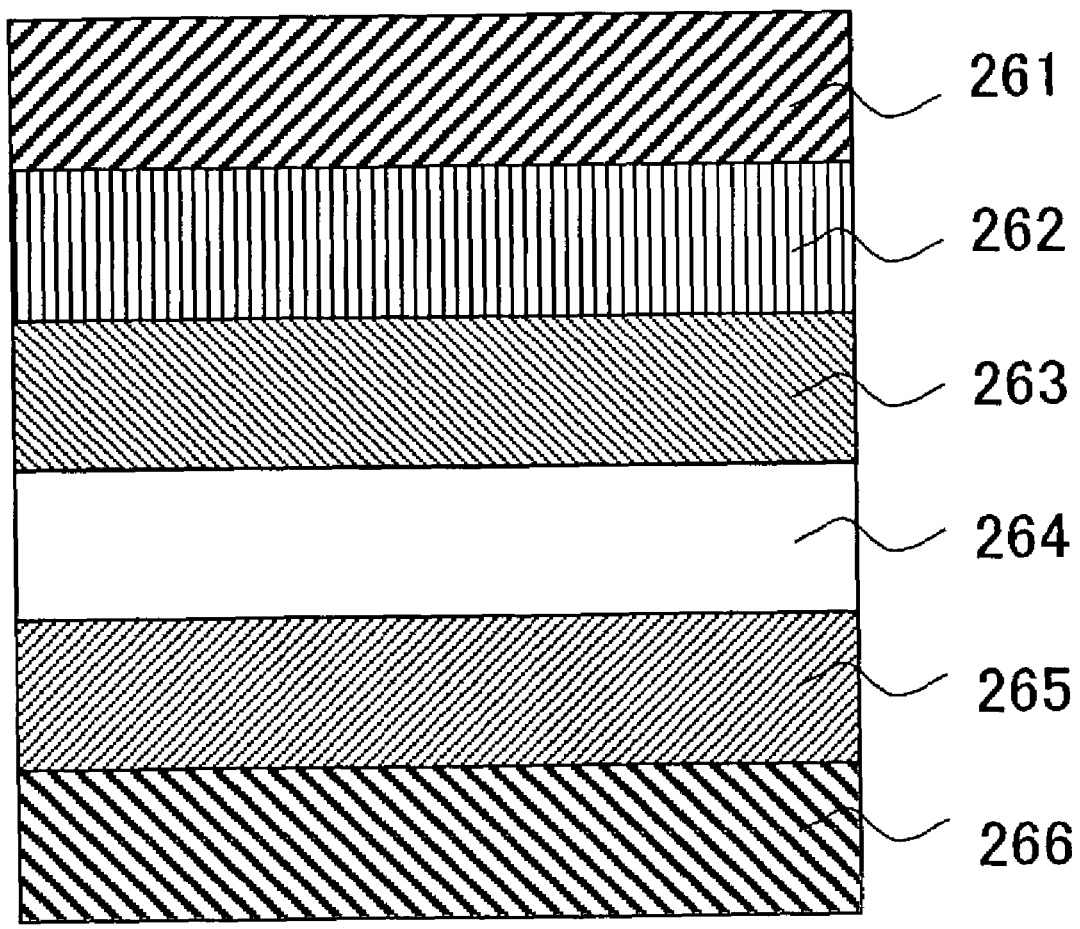
FIG. 26 is a sectional view showing a layer configuration of a highly sensitive element that utilizes a tunneling magnetoresistive effect.

A magnetic recording apparatus according to a fifth embodiment of the present invention will be described with reference to FIGS. 25(a) and 25(b). This magnetic recording apparatus has a general configuration that includes a perpendicular magnetic recording medium 251, a driving section 252 for driving the perpendicular magnetic recording medium 251 for rotation, a magnetic head 253, a driving unit 254 for the magnetic head 253, and a recording/reproduction signal processing unit 255 for the magnetic head 253. The magnetic head used herein is the recording/reproduction-separation-type magnetic head formed on a magnetic head slider. The track width of the single-pole-type recording head is 0.25 µm, the shield gap of the GMR head for reproduction is 0.08 µm, and the track width of the GMR head is 0.22 µm. When the medium C of the above-mentioned third embodiment has been incorporated into the magnetic recording apparatus and then the reading/reproduction characteristics were evaluated under the condition where the head flying height was 10 nm, the linear recording density was 590 kBPI, and the track density was 89 kTPI, a recording/reproduction characteristic specification for the linear recording density of 52.5 Gb/in$^2$ was fully met in the temperature range of 10° C. to 50° C.

Sixth Embodiment

The medium C in the third embodiment was incorporated into a magnetic storage apparatus configured in a similar manner to the magnetic storage apparatus in the fifth embodiment and employing a highly sensitive element that utilizes the tunneling magnetoresistive effect as a read head. Then, evaluation on recording and reproduction was performed under the condition where the head flying height was 10 nm, the linear recording density was 674 kBPI, and the track density was 89 kTPI. A recording/reproduction characteristic specification for the areal recording density of 60 Gb/in$^2$ was fully met in the measuring temperature range of 10° C. to 50° C. The highly sensitive element employed for this evaluation, which utilizes the tunneling magnetoresistive effect, has a known structure that includes an upper electrode 261, an antiferromagnetic layer 262, a pinned layer 263, an insulating layer 264, a free layer 265, and a lower electrode 266.

As clear from the foregoing description, according to a perpendicular magnetic recording medium of the present invention and the method of manufacturing the perpendicular magnetic recording medium, in the perpendicular magnetic recording medium with a perpendicular recording layer formed over a substrate through a soft magnetic underlayer, the soft magnetic underlayer is arranged to include a plurality of soft magnetic layers physically separated by non-magnetic layers. Then, the soft magnetic layers are constituted by nanocrystals, and local magnetic loops are formed through an interlayer magnetostatic interaction that works between the soft magnetic layers that are adjacent to each other through each of the non-magnetic layers. A leakage flux is thereby restrained. Thus, spike noise is suppressed, and modulation of an output signal is also suppressed. Hence, according to the perpendicular magnetic recording medium and the method of manufacturing the perpendicular magnetic recording medium, the perpendicular magnetic recording medium with the recording density of 50 gigabits or more per square inch and a high medium S/N can be realized.

Further, according to a magnetic storage apparatus of the present invention, by providing the perpendicular magnetic recording medium with the above-described configuration, the magnetic storage apparatus with the recording density of 50 gigabits or more per square inch, a low error rate, and a high reliability can be realized.

Other features of the present invention are described, as follows.

A method of manufacturing a perpendicular magnetic recording medium with a perpendicular recording layer formed over a substrate through a soft magnetic underlayer, wherein for forming the soft magnetic underlayer, alternate lamination of amorphous alloy layers that are mainly constituted by Fe and non-magnetic layers is performed, and annealing for causing α-Fe nonocrystals to be formed from the amorphous alloy layers is performed.

A magnetic storage apparatus including a perpendicular recording medium with a perpendicular recording layer formed over a substrate through a soft magnetic underlayer, a driving section for driving the perpendicular recording medium in a recording direction, a magnetic head including a recording section and a reproducing section, a unit for moving the magnetic head relative to the perpendicular recording medium, and a recording/reproduction processing unit for receiving a signal from the magnetic head and reproducing an output signal of the magnetic head, wherein in the perpendicular recording medium, the soft magnetic underlayer includes a plurality of soft magnetic layers physically separated by non-magnetic layers, and the soft magnetic layers are constituted by nanocrystals with a generally random crystallographic orientation.

The recording section of the magnetic head is constituted by a single-pole-type head and the reproducing section of the magnetic head is constituted by a highly sensitive element that utilizes a magnetoresistive effect or a tunneling magnetoresistive effect.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A perpendicular magnetic recording medium with a perpendicular recording layer formed over a substrate through a soft magnetic underlayer, wherein
   a plurality of soft magnetic layers comprising nanocrystals and non-magnetic layers for physically separating the soft magnetic layers are seen on a transmission electron microscopy image observed by irradiating a section of the perpendicular magnetic recording medium with an electron beam in a direction of a normal to the section, wherein
   110, 200 and 211 diffraction rings of a body-centered cubic structure are present in an electron diffraction pattern in a same view as for the transmission electron microscopy image, and wherein
   a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

2. A perpendicular magnetic recording medium with a perpendicular recording layer formed over a substrate through a soft magnetic underlayer, wherein the soft magnetic underlayer includes a plurality of soft magnetic layers physically separated by non-magnetic layers, wherein the soft magnetic layers include nanocrystals, and wherein a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

3. A perpendicular magnetic recording medium with a perpendicular recording layer formed over a substrate through a soft magnetic underlayer, wherein the soft magnetic underlayer includes a plurality of soft magnetic layers physically separated by non-magnetic layers, wherein a thin-film X-ray diffraction profile measured with an X-ray incident angle fixed relative to a surface of a sample of the soft magnetic layers has α-Fe 110, 200 and 211 diffraction peaks, and wherein a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

4. A perpendicular magnetic recording medium with a perpendicular recording layer formed over a substrate through a soft magnetic underlayer, wherein the soft magnetic underlayer includes a plurality of soft magnetic layers physically separated by non-magnetic layers, wherein the soft magnetic layers include nanocrystals with crystallographic orientations that are substantially random, and wherein a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

5. The perpendicular magnetic recording medium according to claim 4, wherein the nanocrystals with substantially random crystallographic orientations means that 110, 200 and 211 diffraction rings of a body-centered cubic structure are present in an electron diffraction pattern measured by irradiating a section of the perpendicular magnetic recording medium with an irradiation of an electron beam in a direction normal to the section of the perpendicular magnetic recording medium.

6. A perpendicular magnetic recording medium with a perpendicular recording layer formed over a substrate through a soft magnetic underlayer, wherein the soft magnetic underlayer includes a plurality of soft magnetic layers physically separated by a non-magnetic layer, and the soft magnetic layers include nanocrystals precipitated by annealing, wherein a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

7. The perpendicular magnetic recording medium according to claim 6, wherein each non-magnetic layer possesses a heat resistance that restrains an interfacial reaction with the soft magnetic layers, to an extent of acting as a non-magnetic layer after the annealing.

8. The perpendicular magnetic recording medium according to claim 1, wherein each nanocrystal is a granular crystal with a size in a range of from 5 to 15 nm.

9. The perpendicular magnetic recording medium according to claim 1, wherein each non-magnetic layer has a thickness in a range of from 1 to 3 nm, and each soft magnetic layer has a thickness in a range of from 50 to 150 nm.

10. The perpendicular magnetic recording medium according to claim 1, wherein each soft magnetic layer contains Fe as a first element, C as a second element, and at least one element selected from the group consisting of Ta, Nb and Ti as a third element.

11. The perpendicular magnetic recording medium according to claim 1, wherein each non-magnetic layer includes an amorphous alloy thin film containing at least one thin film selected from the group consisting of a thin film containing Ta and a thin film containing Ta and Nb.

12. The perpendicular magnetic recording medium according to claim 1, wherein each non-magnetic layer is an amorphous metal thin film with a disordered atom arrangement without having long-range ordering, or a microcrystal metal thin film without exhibiting a clear X-ray diffraction peak.

13. The perpendicular magnetic recording medium according to claim 1, wherein each non-magnetic layer has a thickness as to cause a magnetostatic interaction to act on and between corresponding ones of the soft magnetic layers adjacent one another.

14. The perpendicular magnetic recording medium according to claim 2, wherein each non-magnetic layer has a thickness as to cause a magnetostatic interaction to act on and between corresponding ones of the soft magnetic layers adjacent one another.

15. The perpendicular magnetic recording medium according to claim 3, wherein each non-magnetic layer has a thickness as to cause a magnetostatic interaction to act on and between corresponding ones of the soft magnetic layers adjacent one another.

16. The perpendicular magnetic recording medium according to claim 4, wherein each non-magnetic layer has a thickness as to cause a magnetostatic interaction to act on and between corresponding ones of the soft magnetic layers adjacent one another.

17. The perpendicular magnetic recording medium according to claim 6, wherein each non-magnetic layer has a thickness as to cause a magnetostatic interaction to act on and between corresponding ones of the soft magnetic layers adjacent one another.

18. The perpendicular magnetic recording medium according to claim 2, wherein each nanocrystal is a granular crystal with a size in a range of from 5 to 15 nm.

19. The perpendicular magnetic recording medium according to claim 3, wherein the soft magnetic layers are composed of nanocrystals, with each nanocrystal being a granular crystal with a size in a range of from 5 to 15 nm.

20. The perpendicular magnetic recording medium according to claim 4, wherein each nanocrystal is a granular crystal with a size in a range of from 5 to 15 nm.

21. The perpendicular magnetic recording medium according to claim 6, wherein each nanocrystal is a granular crystal with a size in a range of from 5 to 15 nm.

22. The perpendicular magnetic recording medium according to claim 2, wherein each non-magnetic layer has a thickness in a range of from 1 to 3 nm, and each soft magnetic layer has a thickness in a range of from 50 to 150 nm.

23. The perpendicular magnetic recording medium according to claim 3, wherein each non-magnetic layer has a thickness in a range of from 1 to 3 nm, and each soft magnetic layer has a thickness in a range of from 50 to 150 nm.

24. The perpendicular magnetic recording medium according to claim 4, wherein each non-magnetic layer has a thickness in a range of from 1 to 3 nm, and each soft magnetic layer has a thickness in a range of from 50 to 150 nm.

25. The perpendicular magnetic recording medium according to claim 6, wherein each non-magnetic layer has a thickness in a range of from 1 to 3 nm, and each soft magnetic layer has a thickness in a range of from 50 to 150 nm.

26. The perpendicular magnetic recording medium according to claim 2, wherein each soft magnetic layer contains Fe as a first element, C as a second element, and at least one element selected from the group consisting of Ta, Nb and Ti as a third element.

27. The perpendicular magnetic recording medium according to claim 3, wherein each soft magnetic layer contains Fe as a first element, C as a second element, and at least one element selected from the group consisting of Ta, Nb and Ti as a third element.

28. The perpendicular magnetic recording medium according to claim 4, wherein each soft magnetic layer contains Fe as a first element, C as a second element, and at least one element selected from the group consisting of Ta, Nb and Ti as a third element.

29. The perpendicular magnetic recording medium according to claim 6, wherein each soft magnetic layer contains Fe as a first element, C as a second element, and at least one element selected from the group consisting of Ta, Nb and Ti as a third element.

30. The perpendicular magnetic recording medium according to claim 2, wherein each non-magnetic layer includes an amorphous alloy thin film containing at least one thin film selected from the group consisting of a thin film containing Ta and a thin film containing Ta and Nb.

31. The perpendicular magnetic recording medium according to claim 3, wherein each non-magnetic layer includes an amorphous alloy thin film containing at least one thin film selected from the group consisting of a thin film containing Ta and a thin film containing Ta and Nb.

32. The perpendicular magnetic recording medium according to claim 4, wherein each non-magnetic layer includes an amorphous alloy thin film containing at least one thin film selected from the group consisting of a thin film containing Ta and a thin film containing Ta and Nb.

33. The perpendicular magnetic recording medium according to claim 6, wherein each non-magnetic layer includes an amorphous alloy thin film containing at least one thin film selected from the group consisting of a thin film containing Ta and a thin film containing Ta and Nb.

34. The perpendicular magnetic recording medium according to claim 2, wherein each non-magnetic layer is an amorphous metal thin film with a disordered atom arrangement without having long-range ordering, or a microcrystal metal thin film without exhibiting a clear X-ray diffraction peak.

35. The perpendicular magnetic recording medium according to claim 3, wherein each non-magnetic layer is an amorphous metal thin film with a disordered atom arrangement without having long-range ordering, or a microcrystal metal thin film without exhibiting a clear X-ray diffraction peak.

36. The perpendicular magnetic recording medium according to claim 4, wherein each non-magnetic layer is an amorphous metal thin film with a disordered atom arrangement without having long-range ordering, or a microcrystal metal thin film without exhibiting a clear X-ray diffraction peak.

37. The perpendicular magnetic recording medium according to claim 6, wherein each non-magnetic layer is an amorphous metal thin film with a disordered atom arrangement without having long-range ordering, or a microcrystal metal thin film without exhibiting a clear X-ray diffraction peak.

38. A magnetic storage apparatus including a perpendicular magnetic recording medium with a perpendicular recording layer formed over a substrate through a soft magnetic underlayer, a driving section for driving the perpendicular magnetic recording medium in a recording direction, a magnetic head including a recording section and a reproducing section, a unit for moving the magnetic head relative to the perpendicular magnetic recording medium, and a recording/reproduction processing unit for receiving a signal from the magnetic head and reproducing an output signal of the magnetic head, wherein:

in the perpendicular magnetic recording medium, the soft magnetic underlayer includes a plurality of soft magnetic layers physically separated by non-magnetic layers, and the soft magnetic layers are constituted by nanocrystals with a substantially random crystallographic orientation, wherein a magnetostatic interaction acts on and between adjacent soft magnetic layers through a corresponding non-magnetic layer, and wherein local magnetic closed loops, the magnetizations of which are locally directed in an opposite direction to one another, are formed between the adjacent soft magnetic layers, and each of the soft magnetic layers contains a plurality of crystal grains exchange-coupled to one another in a film plane direction and in a film thickness direction, and a coercive force of the soft magnetic layers is equal to or less than 0.10 Oe.

39. The magnetic storage apparatus according to claim 38, wherein the recording section of the magnetic head is constituted by a single-pole-type head, and the reproducing section of the magnetic head is constituted by a highly sensitive element that utilizes a magnetoresistive effect or tunneling magnetoresistive effect.

* * * * *